United States Patent
Underwood

[11] Patent Number: 6,155,318
[45] Date of Patent: Dec. 5, 2000

[54] ADJUSTABLE PORTABLE SAW SUPPORT

[76] Inventor: William D. Underwood, 20466 S. Hwy. 59, Siloam Springs, Ark. 72761

[21] Appl. No.: 09/034,951

[22] Filed: Mar. 4, 1998

Related U.S. Application Data

[60] Provisional application No. 60/050,427, Jun. 5, 1997, and provisional application No. 60/039,804, Mar. 4, 1997.

[51] Int. Cl.[7] ..................................................... B25H 1/00
[52] U.S. Cl. ................. 144/286.1; 83/471.3; 144/286.5; 144/287; 182/181.1
[58] Field of Search ............................. 83/471.3; 108/69, 108/55.3, 90, 97, 134, 157; 144/286.1, 286.5, 287; 182/181.1, 183.1, 224

[56] References Cited

U.S. PATENT DOCUMENTS

| | | | |
|---|---|---|---|
| 2,496,526 | 2/1950 | Falcone | 182/181.1 |
| 2,876,808 | 3/1959 | Lindheim | 83/471.3 |
| 3,081,841 | 3/1963 | Mauro | 182/181.1 |
| 3,480,111 | 11/1969 | Larson | 182/181.1 |
| 3,628,578 | 12/1971 | Berg . | |
| 3,656,581 | 4/1972 | Larson | 182/181.1 |
| 4,335,765 | 6/1982 | Murphy | 144/286.1 |
| 4,694,720 | 9/1987 | Brickner, Jr. et al. | 83/471.3 |
| 4,798,113 | 1/1989 | Viazanko | 83/471.3 |
| 4,860,807 | 8/1989 | Vacchiano | 144/286.1 |
| 4,987,813 | 1/1991 | Viazanko | 83/471.3 |
| 5,038,650 | 8/1991 | Hodge | 83/471.3 |
| 5,105,862 | 4/1992 | Skinner et al. | 144/287 |
| 5,193,598 | 3/1993 | Estrem | 144/287 |
| 5,320,150 | 6/1994 | Everts et al. | 144/287 |
| 5,473,968 | 12/1995 | Break et al. | 83/471.3 |
| 5,497,816 | 3/1996 | Darland | 144/287 |
| 5,518,053 | 5/1996 | Robison | 144/287 |
| 5,526,856 | 6/1996 | Pedri | 144/287 |
| 5,577,429 | 11/1996 | Noble | 83/468.4 |
| 5,592,981 | 1/1997 | Derecktor | 144/286.1 |
| 5,779,003 | 7/1998 | Carty | 182/181.1 |

*Primary Examiner*—W. Donald Bray
*Attorney, Agent, or Firm*—Head, Johnson & Kachigian

[57] ABSTRACT

An adjustable portable saw support, device, assembly, unit, kit, or the like or table or bench formed of spaced metal triangular shaped base units, a cross support or brace which supports a chop saw, radial arm saw, miter saw, or the like, and can have elongated 2"×4" or 2"×6" legs secured to each of the base units like a sawhorse. Without legs, the base units can rest in the bed of a pickup, on a tailgate, or on a floor. With legs added thereto, the unit can be raised to any desired height. The portable saw support may be used without a saw as a work table or lumber support surface for use with a hand held drill, circular saw, router, or other power or hand tools. Swing arm supports can support, for example, a plurality of 2"×10" or 2"×12" members or lumber laid adjacent one another to provide a large working surface. Each base unit can include an adjustable horizontal end brace or support member which can support one or two 2"×10" members or boards on the upper surface thereof to form a work surface adjacent the saw or without a saw. Insertion of the 2'×6" member into the top of the base unit locks the end brace into position and forms an extension to the right or left of the saw which can extend for 5, 10, 15, 20, or more feet. If a saw is used, it is attached to spaced mounting brackets or supports on a cross-brace is attached to vertical adjustment cross-brace support brackets on the inside of each of the base units. The cross-brace support brackets are adjusted so that the working surface of the saw is raised to the desired level, usually the same height as the 2"×6" members inserted in the tops of the base units.

24 Claims, 34 Drawing Sheets

(22 of 34 Drawing Sheet(s) Filed in Color)

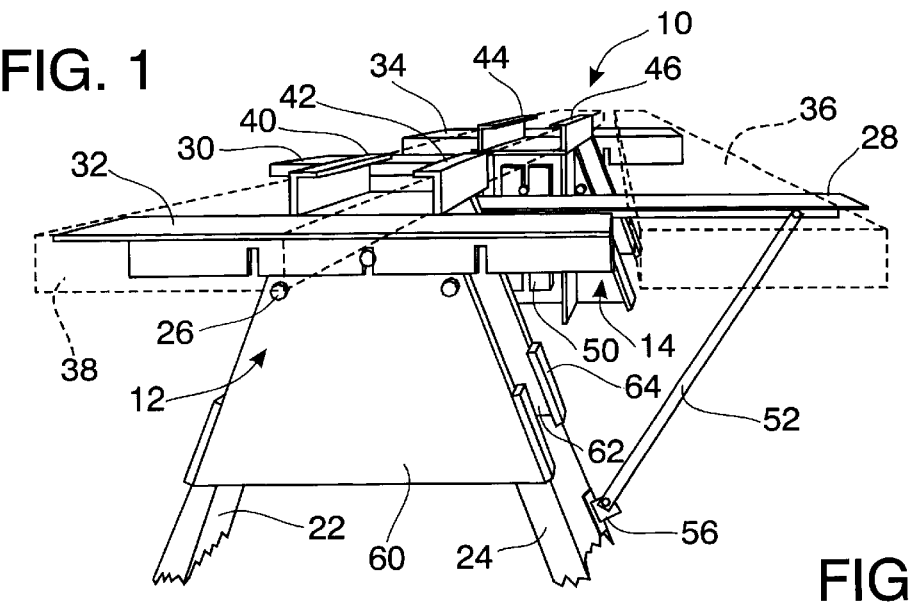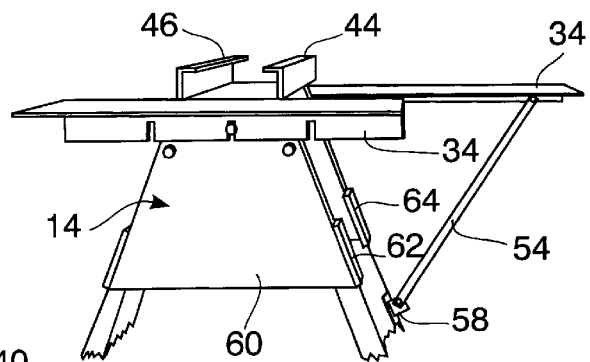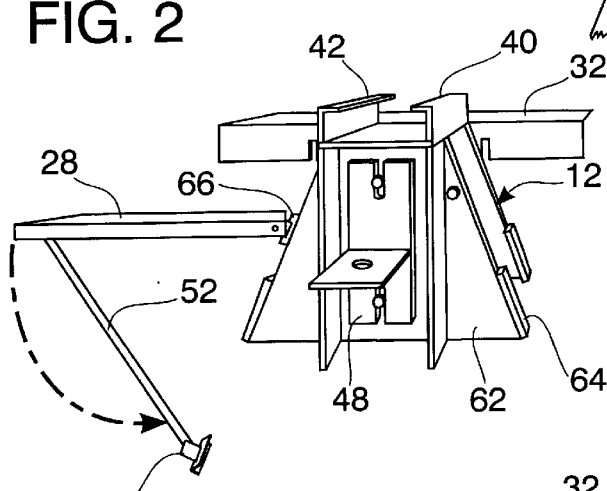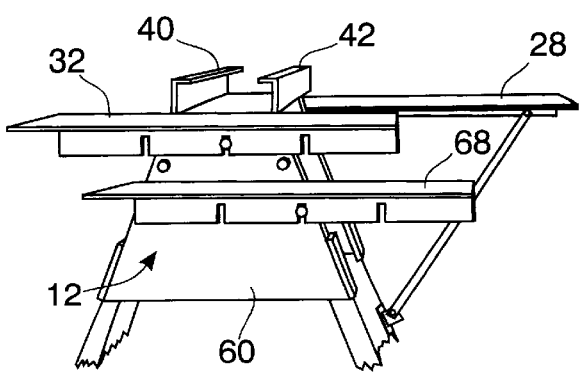

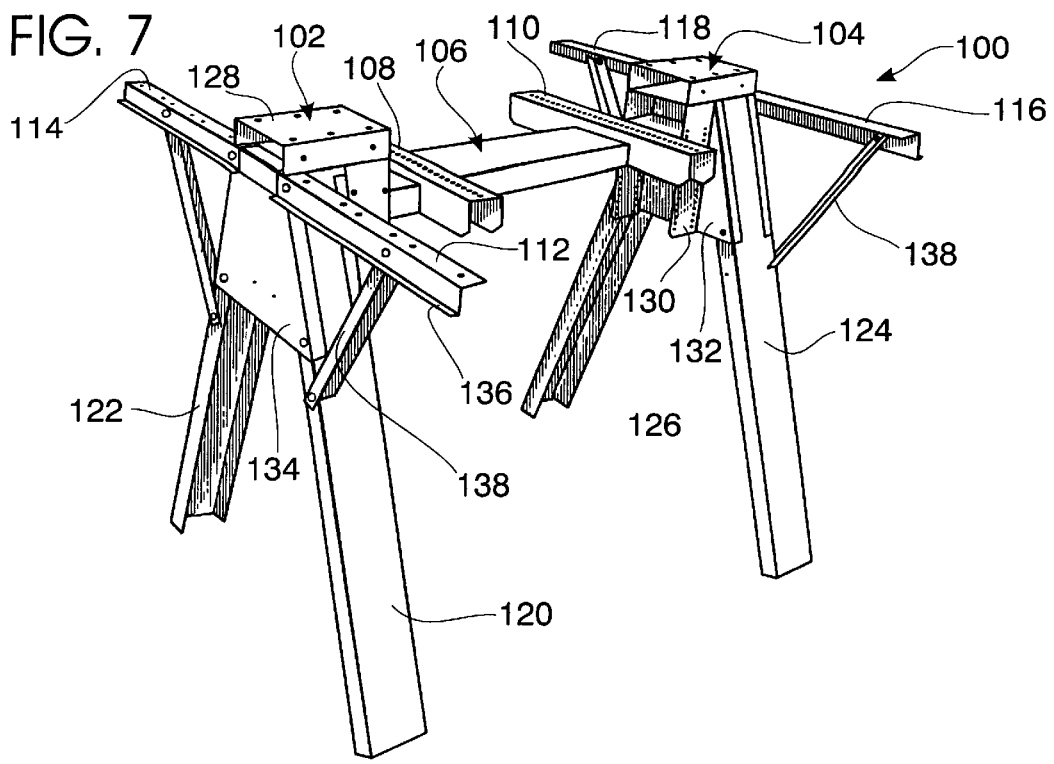
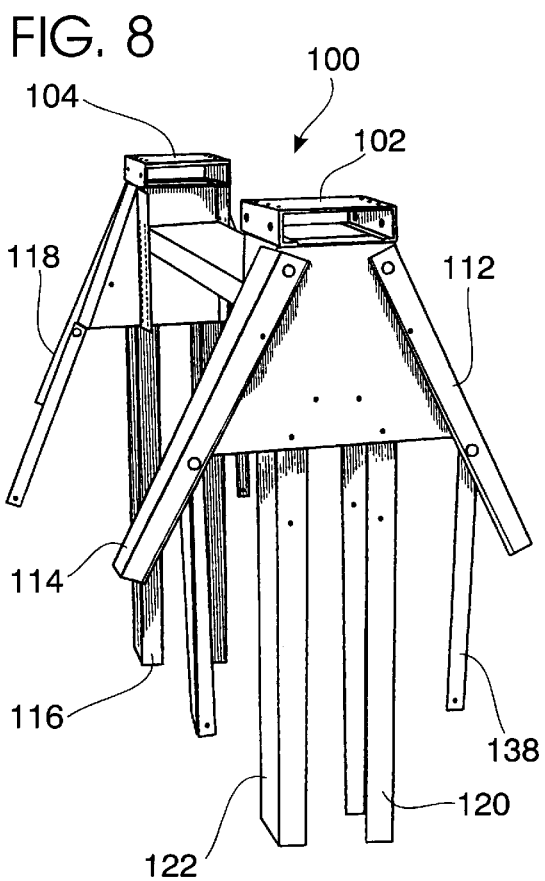

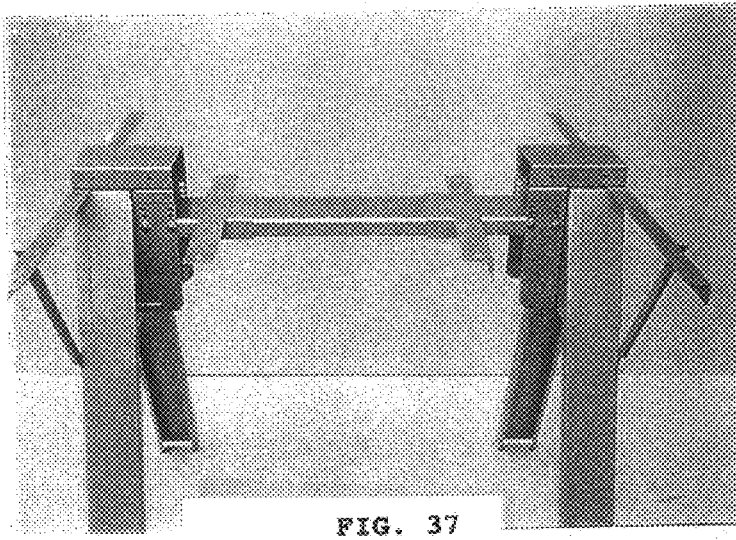

FIG. 37

UNIVERSAL SAW TABLE

Table is 14 Ga. metal, stands 3 ft. high and weighs 52 lbs.

Center brackets are adjustable back and forth. Arms fold down, legs fold in.

Used as a table, it adjusts from 2" to 6", up or down, to fit metal chop saw and miter saw.

The brackets will fit most miter saws and chop saws.

Using 1/2" plywood on the brackets, it will fit most miter saws and radial arm saws.

Saw easily removed, with brackets, by loosening two thumbscrews, for storage, or removal to other work location.

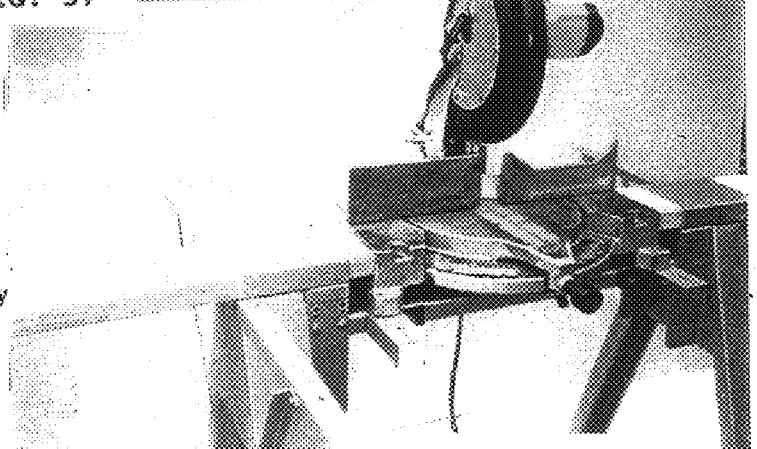

FIG. 38

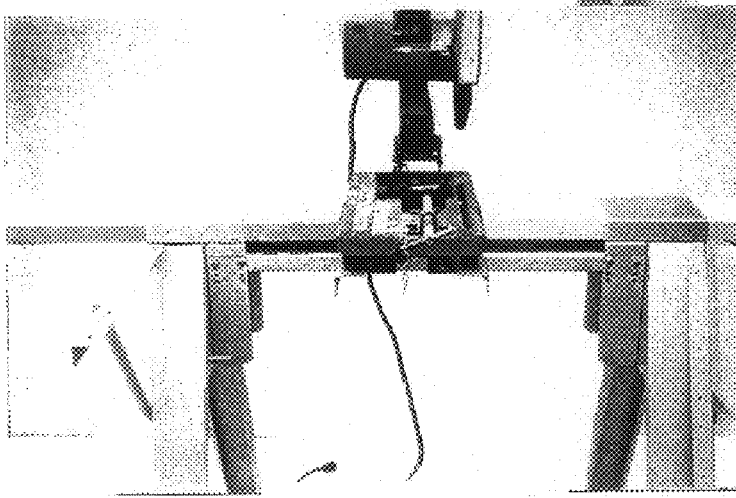

FIG. 39

Metal chop saw, using a 2 X 6.

You can cut long pieces of material with ease.

Using a 2 X 6 frame, 4 X 8 sheets of plywood can be used for a table.

Remove the center channel and each end of this table will adjust to hold any desired length of board to fit your needs.

(No Lumber Included)

Storage or relocation of work site is easy to accomplish. Table legs fold in. Arms will fold down.

THE UNIVERSAL SAW TABLE
ASSEMBLY INSTRUCTIONS

The only tool you will need to assemble the Underwood Stable Table is a 7/16" wrench or a pair of pliers!

Step 1
Place Part A on a flat work surface as shown with the bolts pointing up.

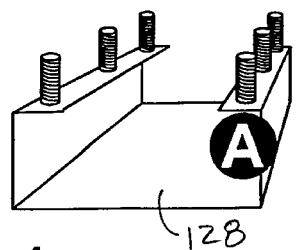

Step 2
Place Part B on Part A and use 2 nuts to secure it in the position shown.

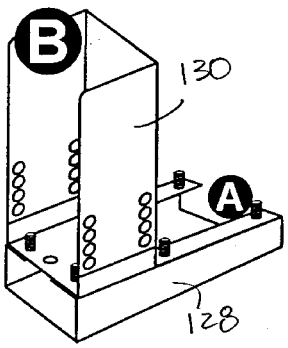

Step 3
There are 2 Part Cs. They are identical. Place one next to Part B on Part A and secure with 2 nuts.

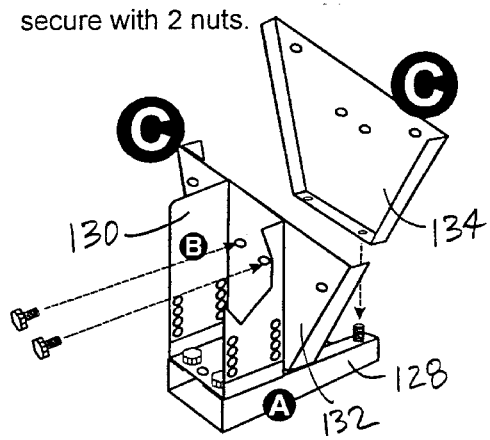

Use 2 bolts to secure Part B and C together.
Then place the other Part C in place on the remaining bolts on part A and secure with two more nuts.

Copyright © June 7, 1997, William D. Underwood

Step 4
Part D is a table leg, Part E is a table support. Part D fits inside the braces (Parts C) as shown. Hold Part E in place on the outside of Part C while you fit a bolt and secure it with a nut. Use another bolt and nut on the other side, which fastens together Parts B, C and D.

Use 2 more nuts and bolts to lock Part D to the assembly as shown.

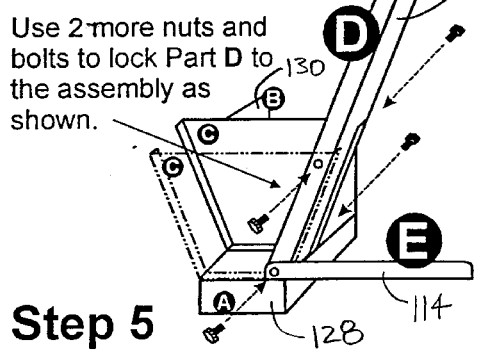

Step 5
Part F is the table support brace. Secure it in the position shown with 2 nuts and bolts. Repeat Steps 4 and 5 to assemble the remaining leg.

You have now assembled one end of the Underwood Universal Saw Table. Repeat the above steps for the other end and you're in

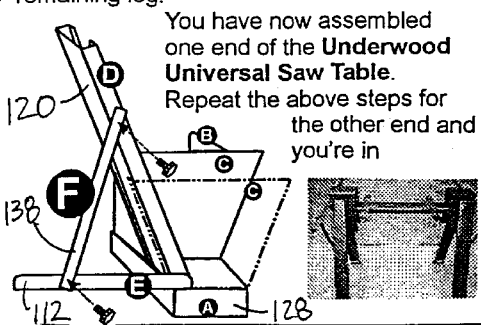

FIG. 45

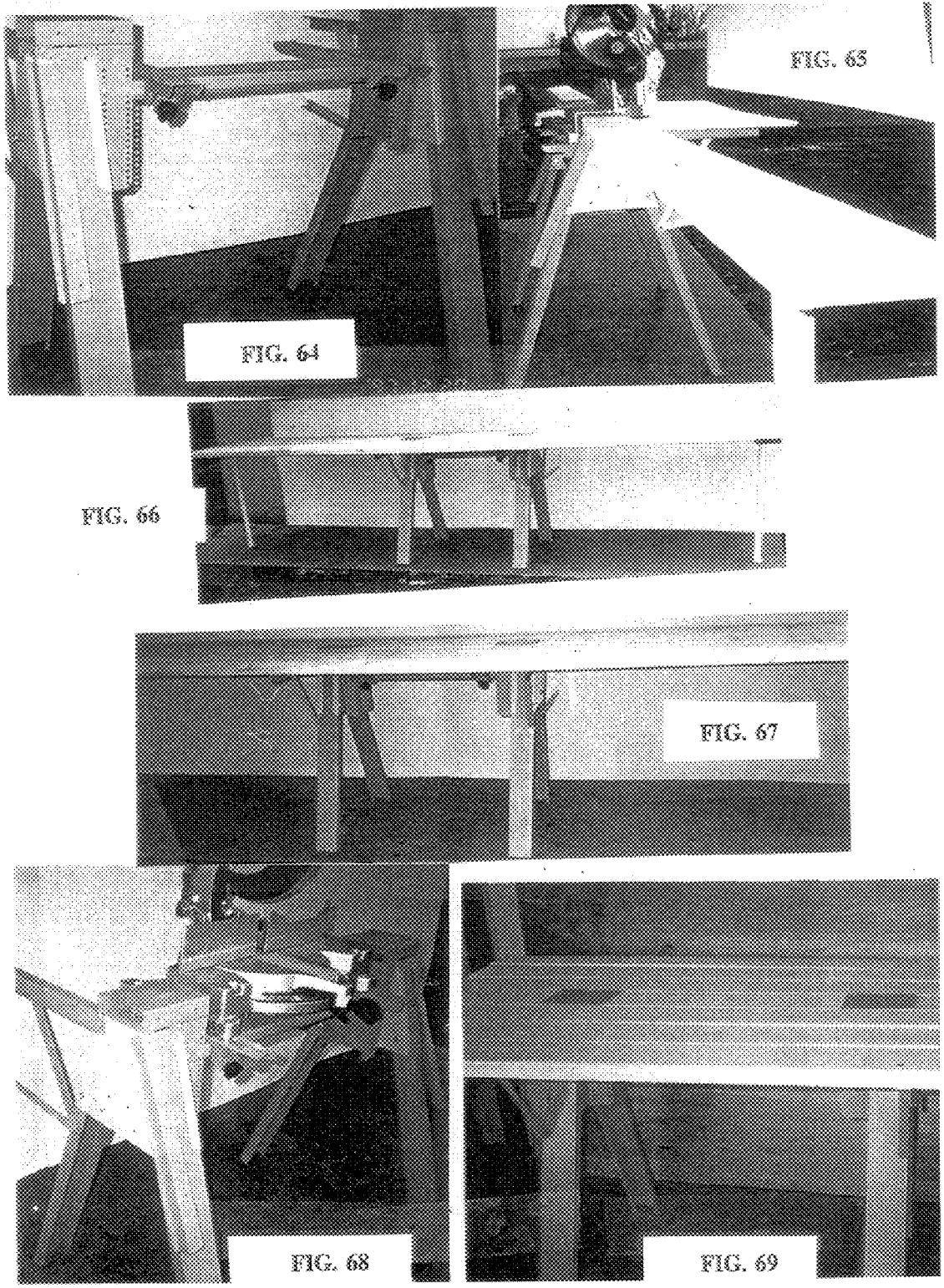

ADJUSTABLE PORTABLE SAW SUPPORT

CROSS-REFERENCE TO RELATED APPLICATIONS

Priority is claimed to and this application is a continuation-in-part of U.S. provisional patent application, Ser. No. 60/039,804, filed Mar. 4, 1997, hereby incorporated by reference and is also a continuation-in-part of U.S. provisional patent application Ser. No. 60/050,427, filed Jun. 5, 1997, hereby incorporated by reference.

BACKGROUND OF THE INVENTION

The present invention is directed to an adjustable, portable, versatile, support device, system, assembly, unit, or the like, and components, therefore, and more particularly concerns an adjustable portable support device including a pair of base units each having a horizontally adjustable end brace, a vertically adjustable cross-brace end support, and which are adapted to be releasably connected one to the other and provide support for a tool, saw, chop saw, work surface, or the like by a cross-brace which itself supports a pair of spaced equipment mounting brackets.

Conventional saw supports suffer from the drawbacks of either being too small and rickety to provide a decent support surface for working with large material, are not adjustable, are too complex and expensive, or are too large to be portable.

For example, the following patents disclose saw supports, extensions, work benches, saw guides, and the like: U.S. Pat. Nos. 5,038,650; 4,860,807; 2,876,808; 3,628,578; 4,694,720; 4,798,113; 5,105,862; 5,193,598; 5,473,968; 5,497,816; 5,526,856; 5,577,429; 4,335,765; 5,320,150; 5,592,981; and 4,987,813.

Hence, there exists a need for an improved, adjustable, portable, versatile, relatively inexpensive, eloquently simple, sturdy, easy to use, support device, system, assembly, unit, components therefore, or the like and/or such a device especially adapted for use with a saw such as a chop saw, miter saw, radial arm saw, and the like.

BRIEF SUMMARY OF THE INVENTION

The present invention is directed to an adjustable, versatile, sturdy, easy to use, portable saw support, device, system, assembly, unit, kit, components therefore, or the like formed of spaced metal triangular shaped base units, and an adjustable cross support or brace which can support a chop saw, radial arm saw, miter saw, or the like. The base units can have elongated 2"×4" or 2"×6" wooden or metal legs secured to each of the base units like a sawhorse. Without legs added thereto, the base units can rest in the bed of a pickup truck or on a floor. With legs added thereto, the base units can be lifted to any desired height. The saw support is extremely versatile and simple to use in that one merely removes and inserts pins or bolts and utilizes 2"×4" or 2"×6" inch lumber or C-channels as legs and cross supports.

The portable saw support of the present invention may be used without a saw as a picnic table, work table or lumber support surface for use with a hand held drill, circular saw, router, or other power or hand tools. Swing arm supports are added to the base units to support, for example, a plurality of 2"×10" or 2"×12" lumber or boards laid adjacent one another to provide a large working surface. Plywood can be added to level or adjust the height of the work surface.

Preferably, each base unit includes a vertical adjustment inner bracket to selectively vertically support the respective ends of the cross brace. Also, each base unit can include an adjustable horizontal end brace which can support one or two 2"×10" boards on the upper surface thereof to form a work surface adjacent the saw or without a saw and is prevented from rotating, for example, once a 2"×6" member is inserted through the top of the base units in the 2"×6" board receiving brackets. Insertion of a 2"×6" board into the top of the base unit locks the end brace into position and forms an extension to the right or left of the saw which can extend for selected distances of 5, 10, 15, or 20 feet or more. This provides an elongated planar support surface adjacent the saw for receiving or supporting long pieces of lumber or other materials.

If a saw is not used, a 2"×6" board or member can be inserted through the top of both the base units to form a saw horse like arrangement and to lock the end braces into position. If a saw or other tool is used, it is preferably attached to spaced mounting brackets or members on the cross-brace which itself is attached to the vertical adjustment cross-brace support brackets on the side of each of the base units. The cross-brace support brackets are adjusted so that the working surface of the saw is raised to the desired level, usually the same height as the top surface of the 2"×6" boards inserted in the tops of the base units. It is contemplated that the base units can be used in conjunction with an 18 inch table saw.

In accordance with a preferred embodiment, the base units, swing arm supports, and adjustable horizontal end braces, cross-brace supports, mounting brackets, and the like are all formed of 14 gauge metal or larger steel stock, and ¼ inch or larger screws, bolts or pins are used for attaching the legs, positioning the horizontal support members, or the like. One-eighth inch lags or set screws can be used to attach the saw support members to the cross-brace in any desired width to accommodate the particular saw or other equipment that is chosen.

The portable saw support of the present invention is easily assembled and disassembled and can be disassembled in accordance with one example to the point where it fits in a 2'×2' or less box and weighs less than 50 lbs. (not including 2"×6" boards).

In accordance with another embodiment of the present invention, the adjustable horizontal end brace on each of the base units is supplemented by a supplemental horizontal end brace attached to the end of the 2"×4" or 2"×6" member inserted through or in the top of each base unit and extended outwardly therefrom. Such remote horizontal end braces provide additional support for boards or members laid along the upper surface of each horizontal end brace and increase the overall stability of the support surface. Each remote horizontal end brace may include a vertical pole or support member providing additional support and stability.

The principle object of the present invention is the provision of an adjustable, portable support device, system, assembly, unit, kit, components therefor, or the like.

Another object of the present invention is the provision of an adjustable, portable saw support device.

A still further object of the present invention is the provision of an adjustable, versatile, sturdy, easy to use, relatively inexpensive, portable, saw support, device, system, assembly, unit, kit, or the like including spaced triangular shaped base or end units.

A still further object of the present invention is the provision of an adjustable, portable saw support device including a pair of spaced metal triangular shaped base units, and an adjustable cross-support or brace for supporting a saw such as a chop saw, or the like.

Other objects and further scope of the applicability of the present invention will become apparent from the detailed description to follow, taken in conjunction with accompanying drawings wherein like parts are designated by like reference numerals.

BRIEF DESCRIPTION OF THE SEVERAL VIEWS OF THE DRAWING

The file of this patent contains at least one drawing executed in color. Copies of this patent with color drawings are provided to the Patent and Trademark Office with payment of the necessary fee.

FIG. 1 is a perspective view illustration of an adjustable portable saw support or device in accordance with an exemplary embodiment of the present invention.

FIG. 2 is a perspective view representation of the inside of the base unit of the saw support or device of FIG. 1.

FIG. 3 is a perspective view illustration of the outside of the base unit of FIG. 1.

FIG. 4 is a fragmentary perspective view representation of the cross-brace and saw mounting members of the support or device of FIG. 1.

FIG. 4A is an end view of the cross-brace and saw mounting member of FIG. 4.

FIG. 7 is a fragmentary perspective view similar to that of FIG. 4 with the saw mounting members having end holes for mounting a chop saw with, for example, four nuts and bolts.

FIG. 8 is a perspective view representation of an alternative embodiment of the base unit of the present invention with the legs in angled or vertical positions.

FIGS. 37–42 are photographic representations of yet still another example of a universal saw table of the present invention.

FIGS. 43–51 of the drawings are directed to another embodiment of an adjustable, portable saw support or device in accordance with another embodiment of the present invention.

FIG. 43 is a perspective view illustration of an adjustable, portable saw support constructed of metal components in accordance with another embodiment of the present invention.

FIG. 44 is an end perspective view representation of the adjustable, portable saw support of FIG. 43 with the legs in a vertical position, the swing arms in a downward angle position, and saw mounting members removed.

FIG. 45 is a schematic illustration of assembly instructions for the portable saw support of FIGS. 43 and 44.

FIG. 46 is a perspective view representation of the top bracket or top of the base unit of the portable saw support of FIG. 43.

FIG. 47 is a perspective view representation of the top bracket of FIG. 46 joined together with the vertical adjustment bracket for the inside of the base unit of the adjustable, portable saw support of FIG. 43.

FIG. 48 is a perspective assembly view of the top and inside brackets of FIG. 47 with the addition of inner and outer triangular or trapezoidal support members which complete the base unit of the portable saw support of FIG. 43.

FIG. 49 is a perspective assembly view representation of the addition of a swing arm and leg member to the base unit of FIG. 48.

FIG. 50 is a perspective assembly view illustration of the addition of a bracing or support member between the swing arm and leg member of FIG. 49.

FIG. 51 is a perspective view illustration similar to that of FIG. 43 with the additional of dimensions in accordance with a particular example of the present invention.

FIG. 53 is a photographic perspective view representation similar to that of FIG. 44 of the drawings.

FIG. 54 is a photographic front perspective view representation of the portable saw support with the legs attached and spread, swing arms in a downward position, and saw mounting members attached to the cross-brace.

FIG. 55 is a photographic perspective view illustration with the swing arms in a raised, horizontal position and supported by bracing or support members.

FIGS. 56 and 57 are photographic representations of the adjustable portable saw support with a saw attached to the saw mounting members.

FIGS. 58 and 59 are photographic perspective view representations of the right and left saw mounting members in accordance with a particular example of the present invention.

As shown in FIGS. 60 and 61 of the drawings, the adjustable, portable saw support or device has upper horizontal rails or support members formed of inverted channels with a horizontal cross-brace attached to the free end of each rail and having a vertical support member or pole extending downwardly therefrom.

FIG. 64 is a photographic representation similar to that of FIG. 57 prior to attachment of the saw thereto.

FIG. 65 is photographic representation similar to that of FIG. 57 of the drawings.

FIGS. 66 and 67 are photographic representations of the adjustable, portable saw support being used to form an elongate, horizontal work table or work surface in accordance with one arrangement or application of the device.

FIG. 68 is similar to FIG. 57.

FIG. 69 is a photographic representation of the adjustable, portable saw support being used to form a work table or work surface.

DETAILED DESCRIPTION OF THE INVENTION

Figure 5:
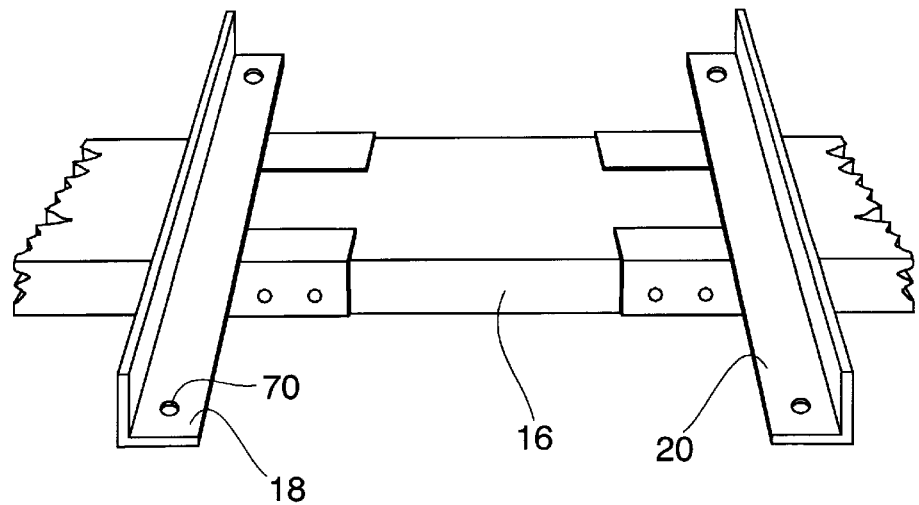
FIG. 5 is a perspective view of the outside of a base unit similar to FIG. 1 with another horizontal end brace in a lower vertical position on the base unit.

As shown in FIGS. 1–7 of the drawings and in accordance with an exemplary embodiment, the present invention is directed to an adjustable portable saw support, device, assembly, unit, kit, or the like 10 or saw or work table formed of spaced metal triangular or trapezoidal shaped base units 12 and 14, and an adjustable cross support or brace 16 with saw supports 18 and 20 which releasably support a chop saw, radial arm saw, miter saw, or the like. The device 10 can have elongated 2"×6" legs 22 and 24 secured to each of the base units 12 and 14 like a sawhorse. Without legs, the base units 12 and 14 can rest in the bed of a pickup, on a tailgate, or on a floor. With legs 22 and 24 added thereto, the unit 10 can be raised to any desired height. The saw support 10 is extremely versatile and simple to use in that one merely removes and inserts pins, screws, or bolts 26 and utilizes 2"×4" or 2"×6" metal members, channels, or lumber as legs 22 and 24 and cross support 16.

The portable saw support 10 of the present invention may be used without a saw as a picnic table, work table or lumber support surface for use with a hand held drill, circular saw, router, or other power or hand tools (FIGS. 9 and 26–28). Swing arm supports 28 and 30 pivotally attached to each base unit 12 and 14 can support, for example, a plurality of 2×10" boards or members or 2"×12" boards or members laid adjacent one another to provide a large working surface adjacent the base units. Plywood can be added as necessary to adjust the height of the work surface. Each base unit includes an adjustable horizontal end brace or support member 32 and 34 which is horizontally and vertically adjustable and can support one or two 2"×10" members or boards 36 on the upper surface thereof to form a work surface adjacent the saw or without a saw and is prevented from rotating once a 2" 6" board or member 38 is inserted into the top of the base units 12 and 14 between two inverted L brackets 40 and 42 and 44 and 46. Insertion of a 2"×6" member or board into the top of the base unit locks the end brace 32 or 34 into position and forms an extension to the right and/or left of the saw which can extend for 5, 10, 15, 20, or more feet (FIGS. 10–13, 32–34, and 36). This provides an elongated planar support surface adjacent the saw for receiving and supporting long pieces of lumber or other materials. If a saw is not used, a single 2"×6" board or member 38 can be inserted through the top of both the base units to form a sawhorse like arrangement and to lock the end braces into position (FIGS. 1, 26–28, 35, 40, and 41).

If a saw is used, it is attached to spaced mounting brackets or supports 18 and 20 on cross-brace 16 the ends of which are each releasably attached by a pin or bolt to a vertically adjustable cross-brace support bracket 48 and 50 on the inside of each of the base units 12 and 14. The cross-brace support brackets 48 and 50 are adjusted so that the cross-brace 16, saw supports 18 and 20 and the working surface of the saw is raised to the desired level, usually with the working surface of the saw at the same height as the 2"×6" boards inserted in the tops of the base units 12 and 14. It is contemplated that the base units 12 and 14 can be used in conjunction with an 18 inch table saw.

With reference again to FIGS. 1–3 of the drawings, each of the swing arm horizontal supports 28 and 30 has one end pivotally attached to each of the respective base units 12 and 14 and the other end or free end supported by a respective support member 52 and 54 and leg bracket 56 and 58 with the support members 52 and 54 pivotally attached to each swing arm 28 and 30 and the respective brackets 56 and 58 pivotally attached to the support members 52 and 54. When not in use, the swing arms 28 and 30 are allowed to swing downwardly out of the way by releasing the attachment of brackets 56 and 58 to the respective legs. For example, by removing pins, screws or bolts. When it is desired to have the swing arms 28 and 30 in the horizontal position shown in FIGS. 1–3, the respective brackets 56 and 58 are located at the proper location on respective legs and releasably fixed in position by pins, screws, bolts, or the like. If one desires to place the swing arms 28 and 30 in a position other than horizontal, the angle can be selected by moving the respective brackets 56 and 58 down along the leg and releasably or selectively fixing the bracket in position thereon with screws, bolts, pins, or the like.

Figure 10:
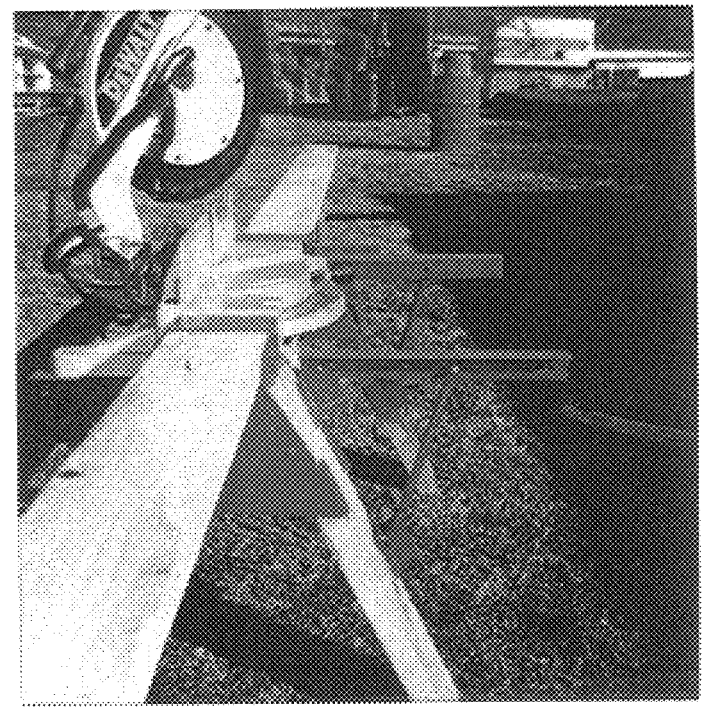
FIGS. 10–14 are photographic representations of an example of an adjustable saw support in accordance with one embodiment of the present invention.
Figure 11:
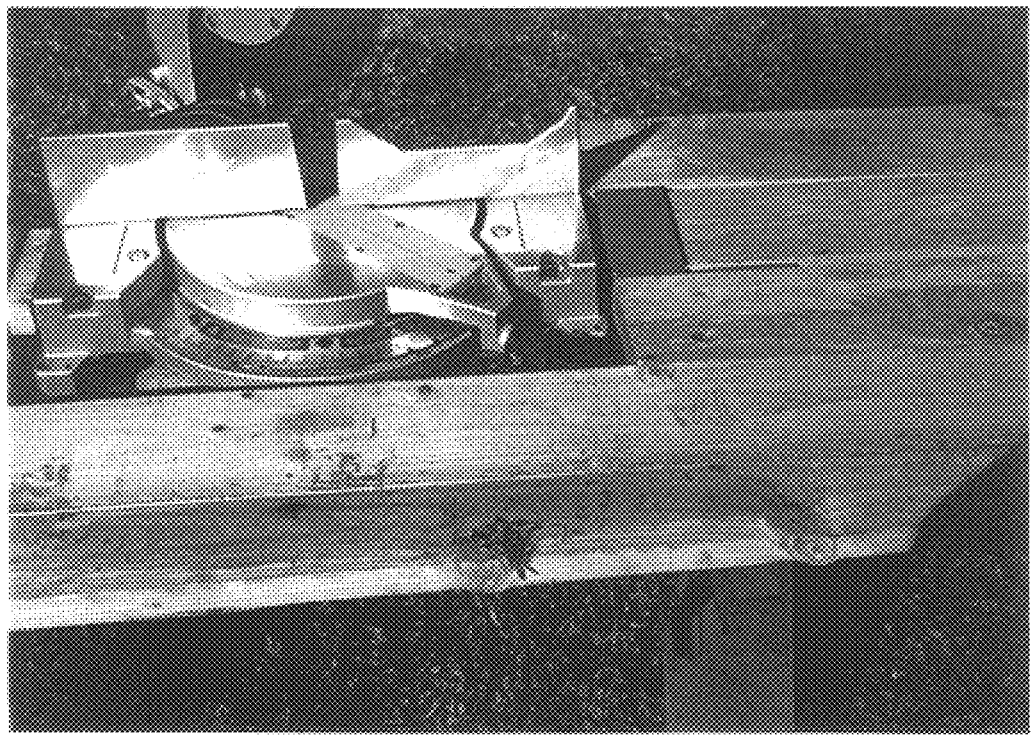
Figure 29:
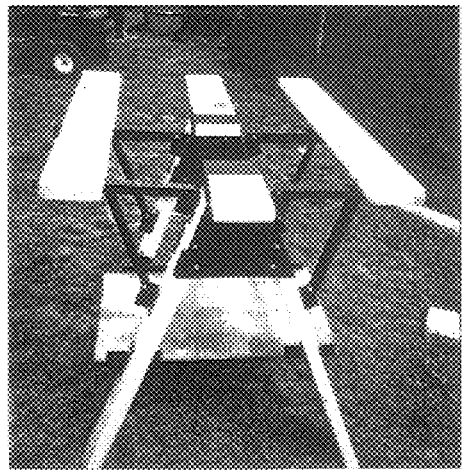
Figure 27:
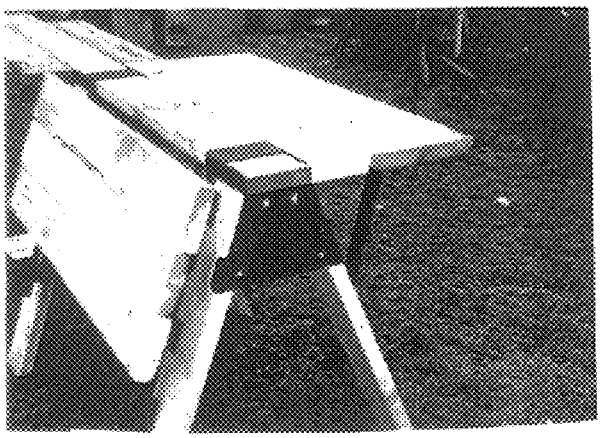

In accordance with the present invention, the device 10 may include a plurality of swing arm supports which may extend from opposite sides of the device, the same side of the device, or both and at the same or different levels. As shown in FIG. 10 of the drawings, a swing arm extends horizontally out from each of the base units on the same side of the device. As shown in FIG. 29, swing arms extend outwardly from each side of each of the base units and at the same level.

Each of the base units 12 and 14 includes triangular or trapezoidal vertical plates 60 and 62 each having attached thereto small rectangular stop plates 64 to prevent the legs 22 and 24 from spreading farther than the angle of the plates 60 and 62.

Figure 6:
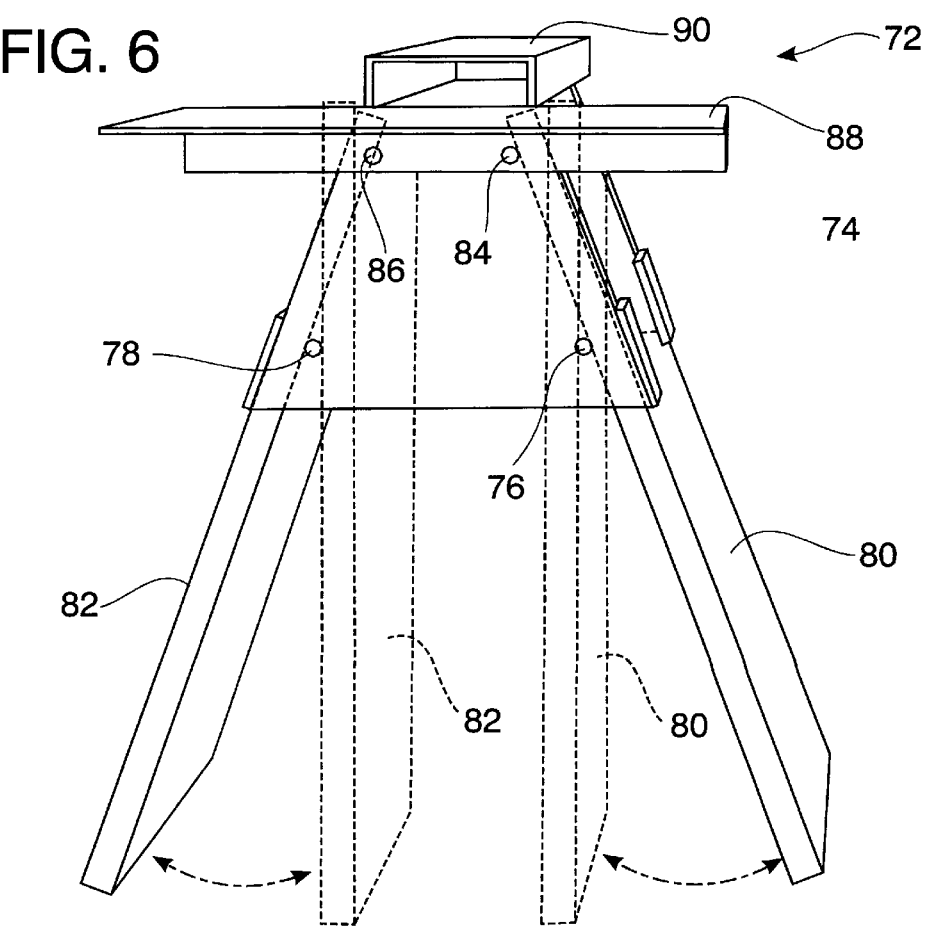
FIG. 6 is a perspective view illustration similar to that of FIG. 2 except that the swing arm is shown vertically adjustable along the side of the base unit.

With reference to FIG. 6 of the drawings, swing arm 28 is made vertically adjustable by attaching the swing arm to a bracket 66 which is adapted to be attached to the base unit or leg at any desired location to allow for vertical adjustment in the location of the swing arm 28. The bracket 66 is attached to the base unit or leg using screws, bolts, pins, or the like.

With reference again to FIG. 5 of the drawings, a second horizontal end brace 68 is shown attached to base unit 12 in a position vertically below horizontal end brace 32. Each of the end braces 32, 34 and 68 includes a plurality of openings or slots adapted to be received just behind the head of a bolt threadably received in a corresponding threaded opening in plate 60. By having a plurality of slots in each of the end braces 32, 34, and 68, each end brace is not only horizontally adjustable, but also vertically adjustable by using bolts in openings located further down on the plate 60 or even in the legs 22 and 24.

As shown in FIG. 7 of the drawings, each of the saw supports 18 and 20 may include one or more openings 70 to accommodate releasable attachment of a saw or other device thereto. In accordance with the present invention, it is contemplated that quick release clamps, fasteners, or the like may be used so that saws may be selectively attached and detached to the device 10. Different power tools, saws, and the like are accommodated in that the saw supports 18 and 20 can be selectively located along cross-brace 16 or can be removed if desired.

As shown in FIG. 8 of the drawings and in accordance with another embodiment of the present invention, a portable saw support device, apparatus, system, assembly, unit, kit, or the like generally designated 72 includes a plurality of base units 74 similar in construction to the base units 12 and 14 of device 10. Each base unit 74 includes additional safety bolts or leg stops 76 and 78 which keep or hold the legs 80 and 82 in their outwardly angled or spread position. Further, the base unit 74 include bolts 84 and 86 which pass through an end brace 88 just inside the upper end of legs 80 and 82. Legs 80 and 82 may be removed by either removing bolts 76 and 78 or by pulling the legs 80 and 82 downwardly and out of the base unit 74.

Still further, base unit 74 includes an enclosed top bracket 90 in place of the inverted L-brackets 40 and 42 of base unit 12 of device 10. Top bracket 90 is adapted to receive a 2"×4" or 2"×6" member or board as shown, for example, in FIGS. 10–16, 20–29, and 32–42.

In accordance with the exemplary embodiment, the base units 12 and 14, swing arm supports 28 and 30, adjustable horizontal end braces 32 and 34, cross-brace brackets 48 and 50, mounting brackets 18 and 20, and the like are all formed of 14 gauge to ⅛ inch thick or larger steel or other metal stock, and ¼ inch diameter bolts, screws or pins are used for attaching the legs, positioning the horizontal support members, and the like. One-eighth inch diameter lags or screws can be used to attach the saw support members 18 and 20 to the cross-brace 16 in any desired width to accommodate the particular saw or other equipment that is chosen.

The saw support 10 is easily assembled and disassembled and can be disassembled in accordance with one example to the point where it fits in a 2 ft.×2 ft. or less box and weighs less than 50 lbs. (not including 2"×6" boards).

Figure 9:
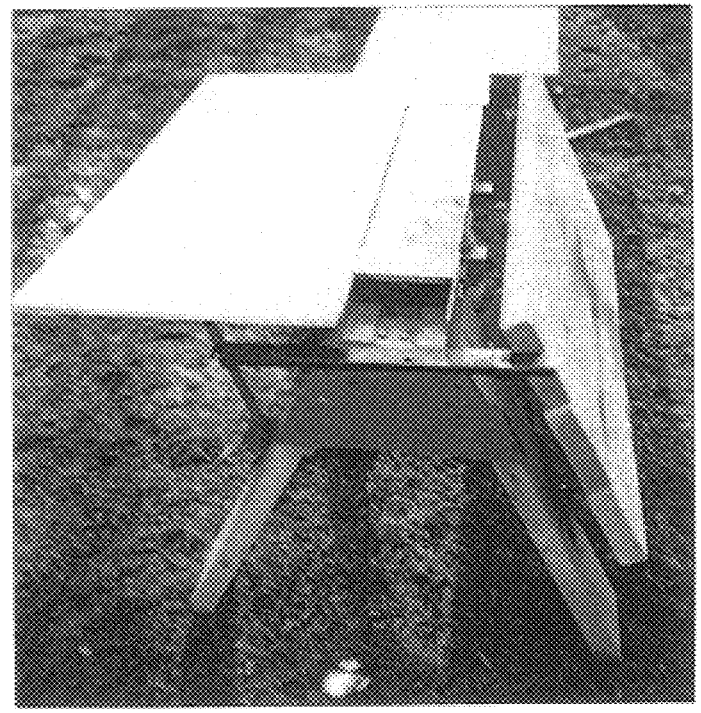
FIG. 9 is a photographic illustration of an example of an adjustable support of the present invention without a saw.

With reference to FIG. 9 of the drawings, there is shown a portable saw support or device with red colored base units, black end braces, and red swing arm supports.

With reference to FIGS. 10–14 of the drawings, there is shown a portable saw support or device having red base units with at least partially enclosing top brackets, and red vertically adjustable swing arms having upper and lower brackets adapted to be releasably and selectively attached to the respective legs thereof.

Figure 13:
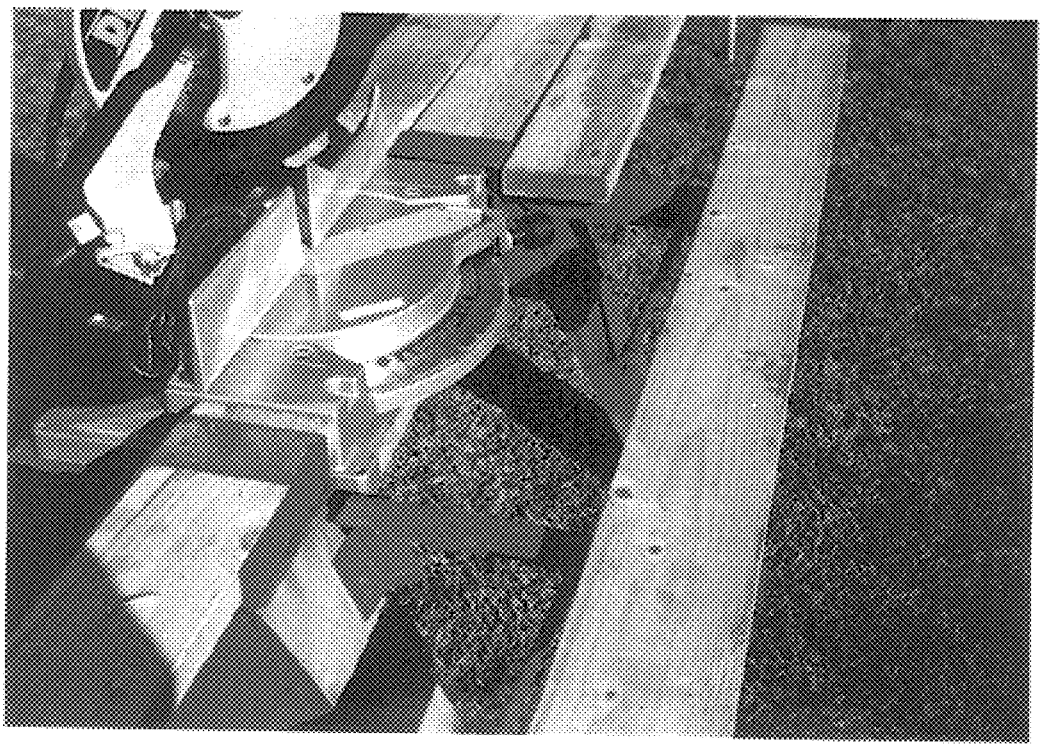
Figure 14:
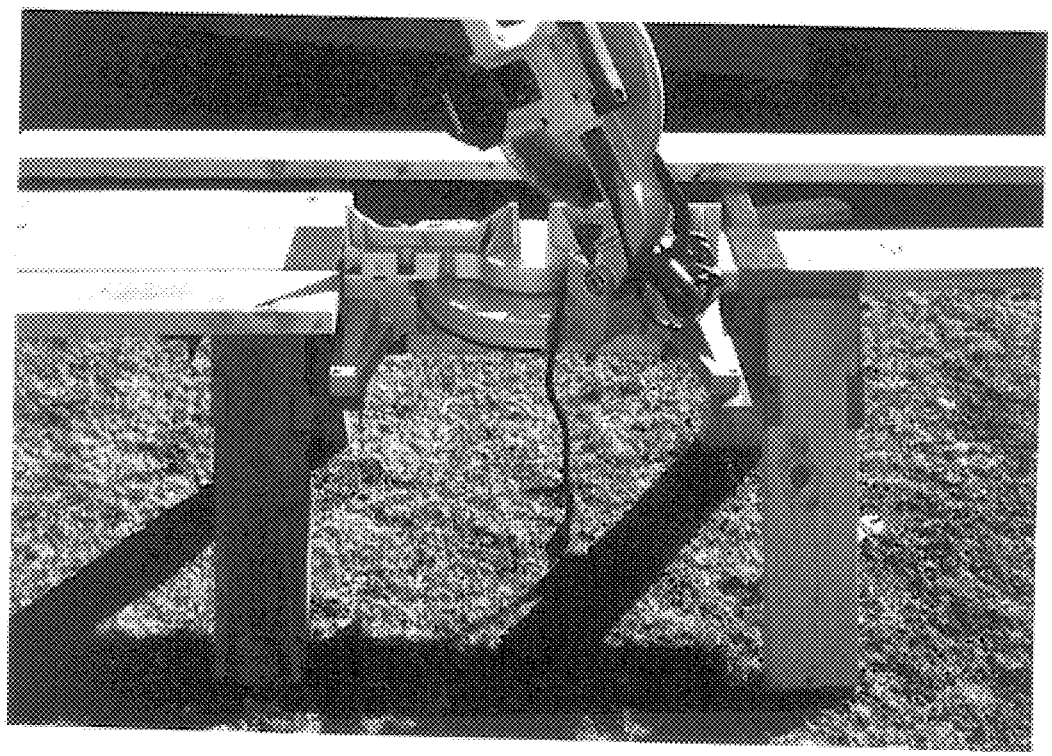
Figure 15:
FIGS. 15–36 are photographic representations of another example of a universal saw support of the present invention.
Figure 16:
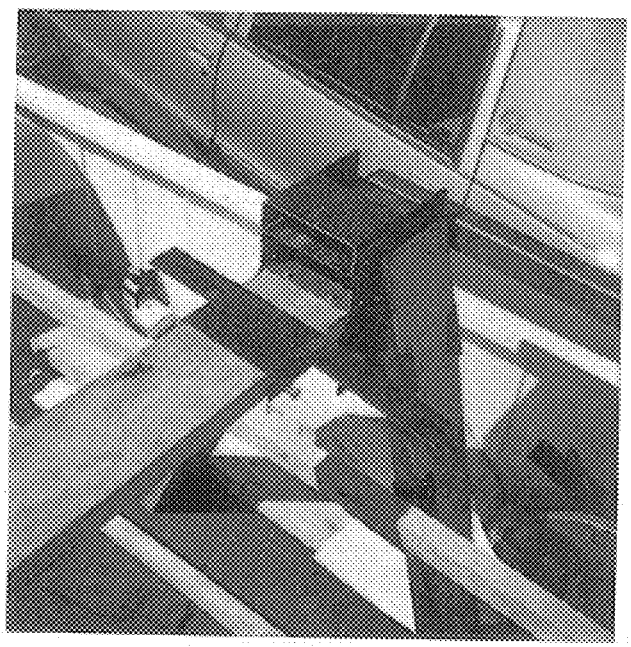
Figure 17:
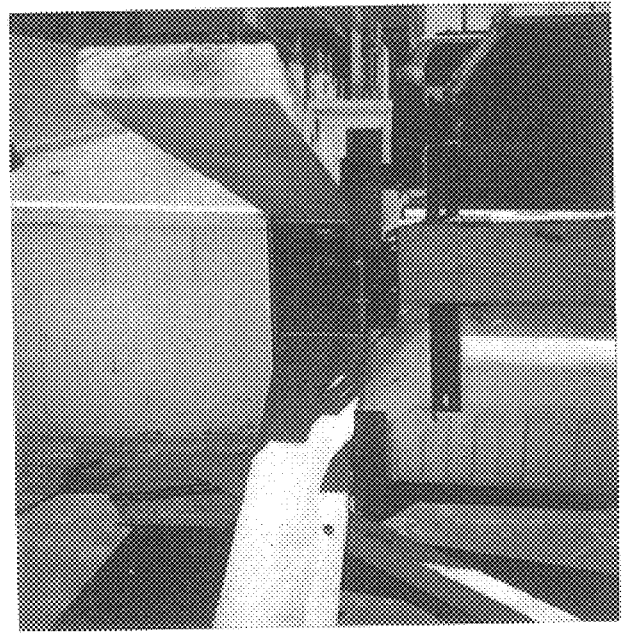
Figure 18:
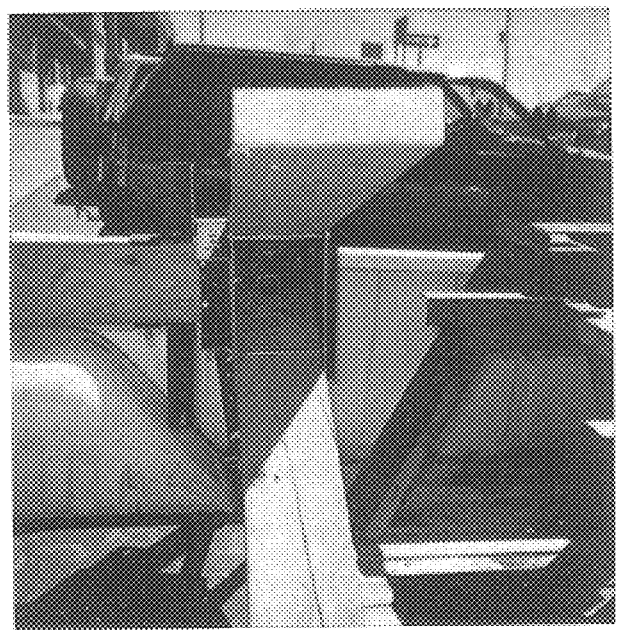
Figure 19:
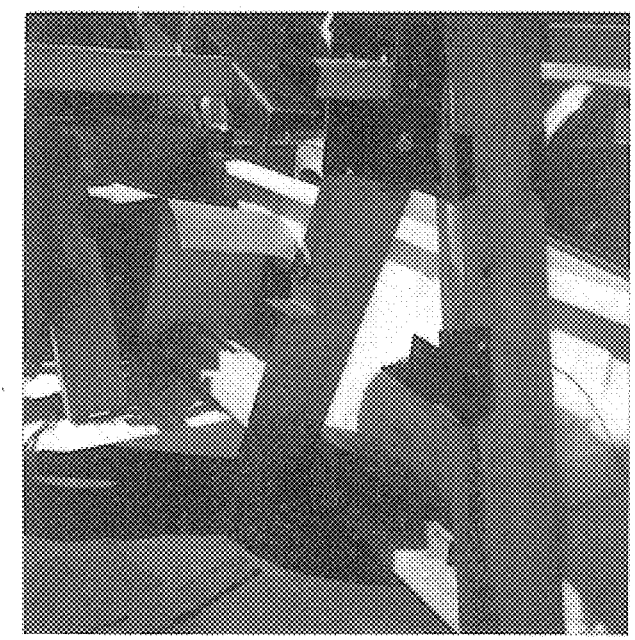
Figure 20:
Figure 21:
Figure 22:
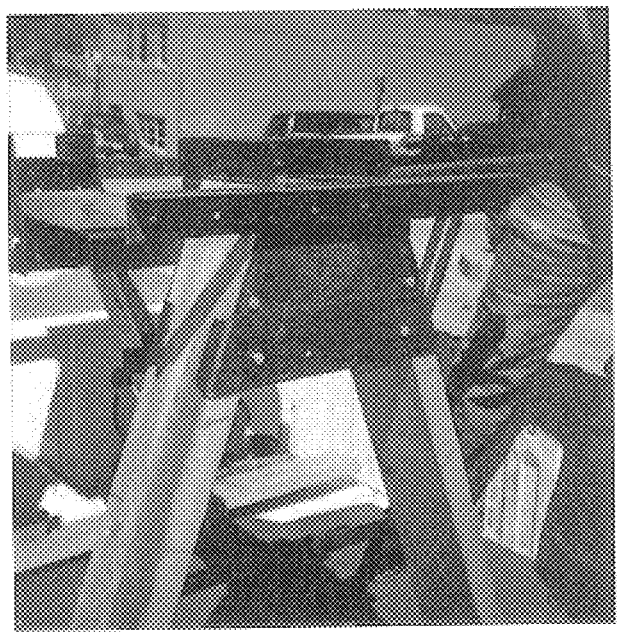
Figure 23:
Figure 24:

With particular reference to FIGS. 13 and 14 of the drawings, the saw support members on the cross-brace are shown to extend further to the rear of the device than the front of the device so that the cutting area of the chop saw, miter saw, or the like is aligned with the boards or members inserted into the top brackets of each of the base units.

FIGS. 15–25 of the drawings depict another embodiment of the portable saw support or device of the present invention having black colored base units with at least partially enclosing top brackets, black colored vertically adjustable swing arms, black end braces which are both vertically and horizontally adjustable, black saw support members which are releasably attached to a wooden cross-brace, and wherein each of the base units includes respective pairs of spaced vertical cross-brace support members having a plurality of spaced openings for receiving bolts, pins, or screws therethrough for supporting the ends of the cross-brace in a desired vertical position in each base unit. Further, this embodiment includes angled nubs or flanges inside each base unit for fixing the position of the upper end of the legs in place of bolts or pins. Still further, this embodiment includes leg brackets along the legs of the device for providing an additional support surface or level to the device.

Figure 25:
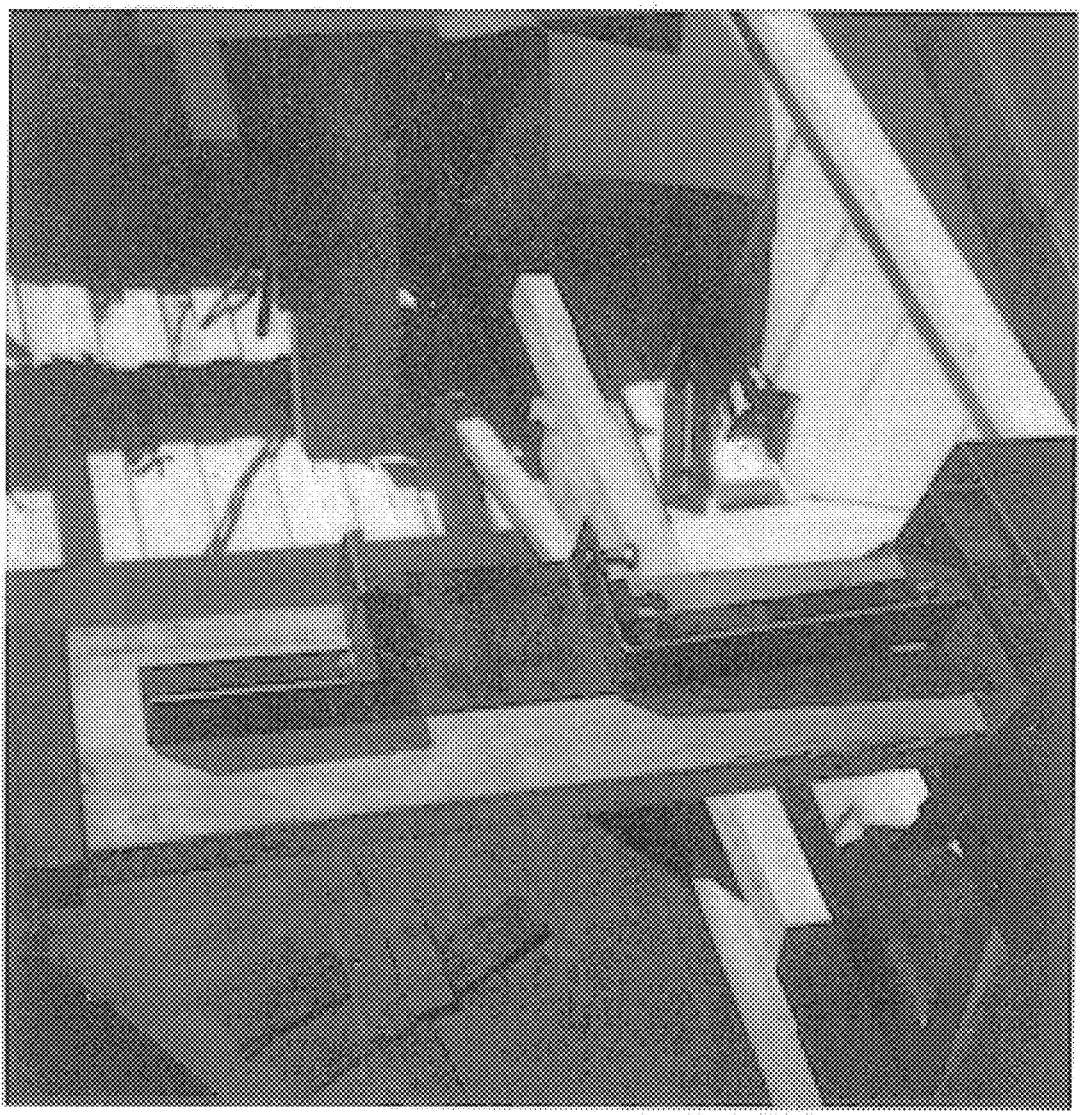
Figure 26:
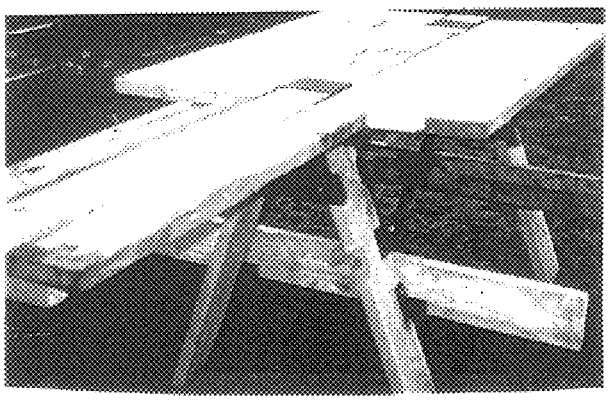

With particular reference to FIG. 25 of the drawings, each of the saw support members is adapted for quick release and attachment to and from the cross-brace by having each support member include a cross-brace engaging flange on one side and a threaded fastener on the other side. To attach the saw support to the cross-brace, one merely unscrews the threaded fastener, inserts the flange or lip under the cross-brace, places the support arm down on the cross-brace, and then tightens the threaded fastener to hold it in place.

FIGS. 26–30 and 32–36 of the drawings show the different arrangements or applications of the device of FIGS. 15–25.

Figure 30:
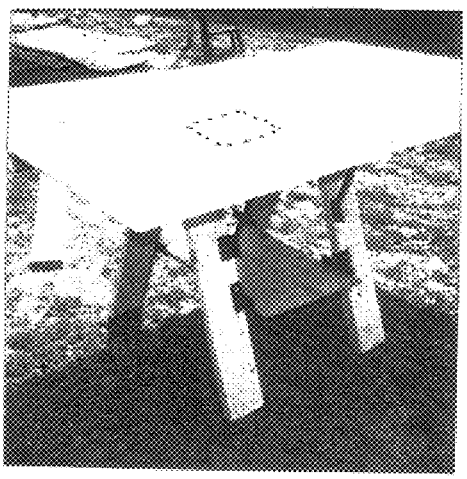
Figure 28:
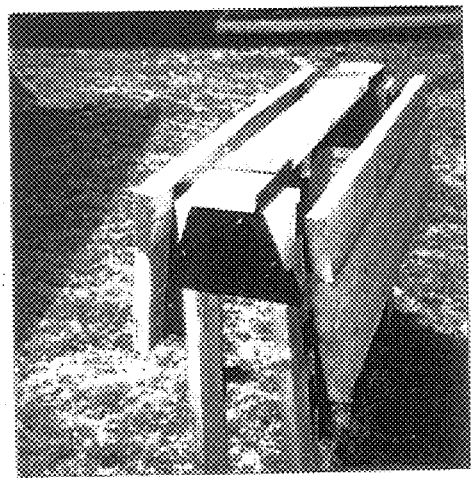

With respect to FIG. 30 of the drawings, a drop table for a table saw is formed by placing, for example, an 18"×24" sheet of plywood on the leg brackets to form a lower table saw support surface and cutting an opening in the sheet of plywood as shown in dotted lines.

Figure 35:
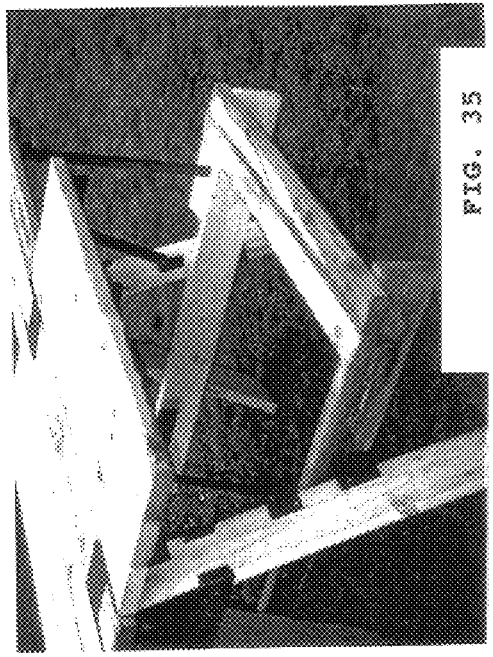
Figure 33:
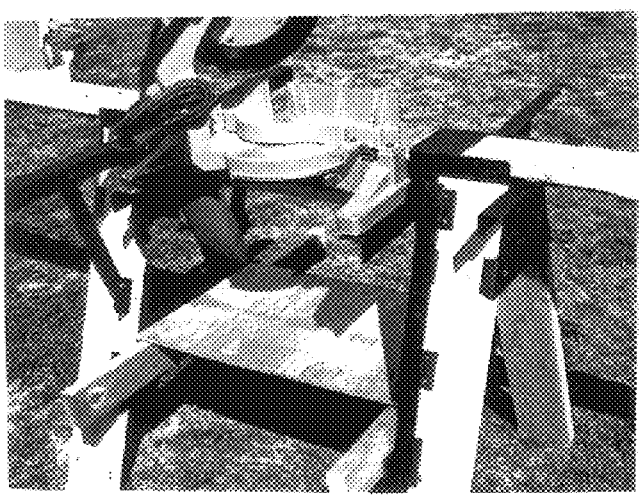
Figure 36:
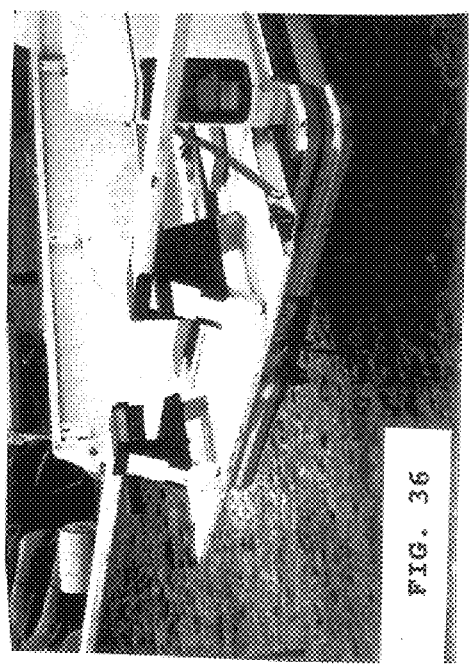
Figure 34:
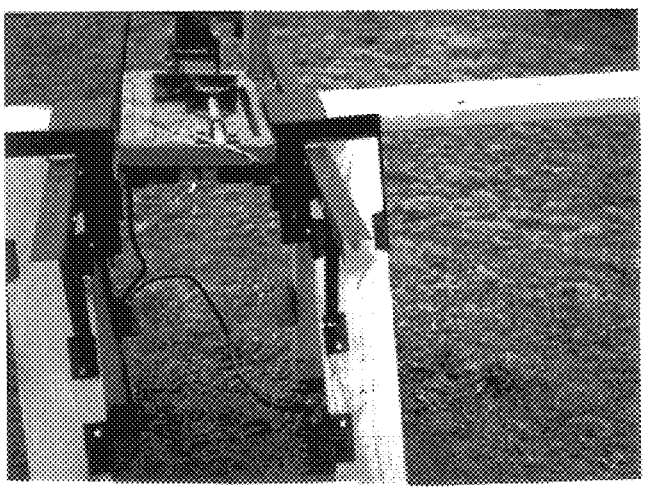

Also, as shown in FIG. 35, a picnic table can be formed.

Figure 31:
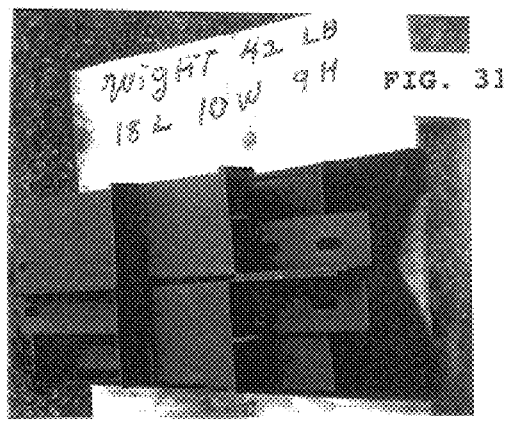
Figure 32:
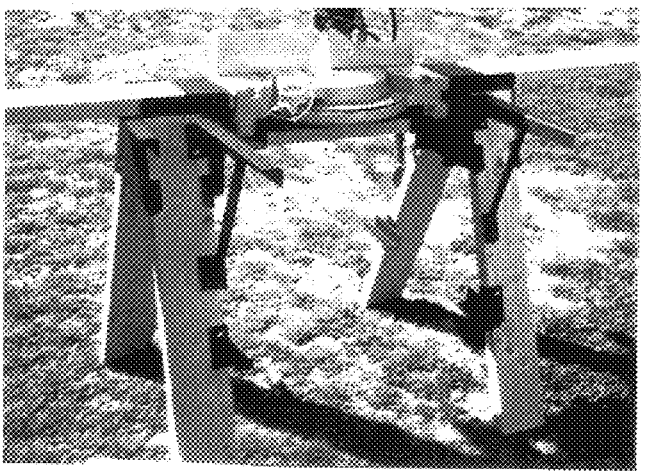

FIG. 31 of the drawings shows the base units and saw supports disassembled and arranged to fit within a box about 18" long, 10" wide, and 9" high, and having a weight of about 42 lbs.

Figure 40:
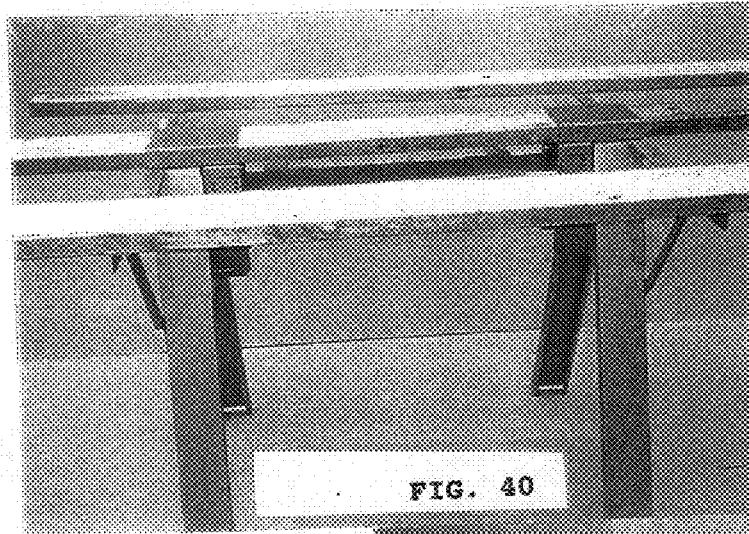
Figure 41:
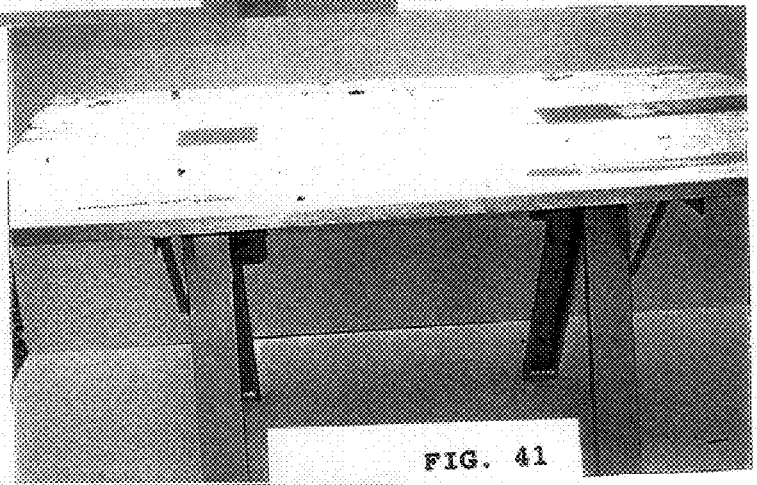
Figure 42:
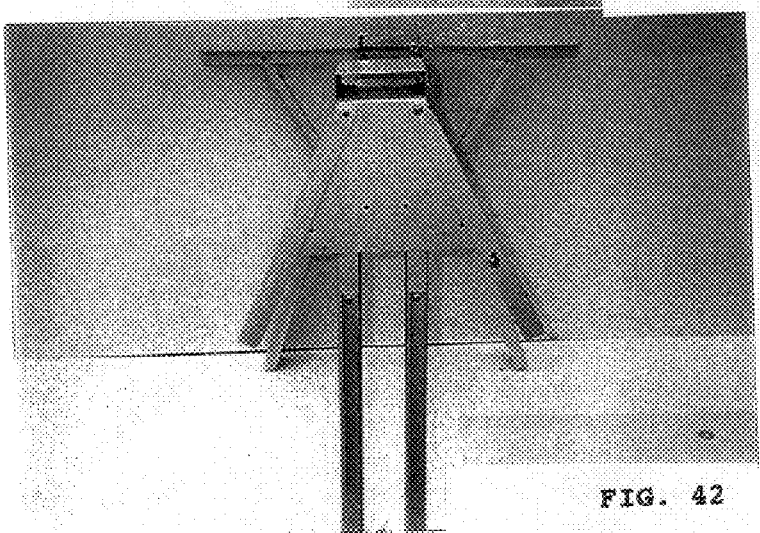

FIGS. 37–42 of the drawings are directed to another embodiment of a portable saw support or device in accordance with the present invention. The embodiment of FIGS. 37–42 is constructed of 14 gauge metal, stands 3 ft. high, and weighs 52 lbs. The center brackets are adjustable back and forth, the arms fold down, and the legs fold in. The cross-brace adjusts from 2" to 6" up or down to fit a metal chop saw and miter saw. The saw supports or center brackets will fit most miter saws and chop saws. Using ½" plywood on the center brackets (saw supports) it will fit most miter saws and radial arm saws. The saw is easily removed, with saw support brackets attached, by loosening two thumb screws, for storage or removal to other work locations. FIG. 37 shows the device without a saw. FIG. 38 shows the device with a miter saw. FIG. 39 shows the device with a metal chop saw and using 2"×6" boards or members adjacent thereto to facilitate the cutting of long pieces of material. FIG. 40 shows the device without a saw and with three 2"×6" boards or members used as a support for a 4 ft.×8 ft. sheet of plywood to form a table. FIG. 41 shows the device without a saw and with a plurality of 2"×6" members to form a sturdy work table. One can remove the cross-brace and spread each of the base units any desired distance apart or together to form tables of varying lengths. FIG. 42 shows the device with one end adjusted for storage or relocation having the legs folded in and the arms (swing arms) folded down against the base units.

With reference to FIGS. 43–51 and 54–59 of the drawings and in accordance with another embodiment of the present invention similar to that of FIGS. 37–42 of the drawings, an adjustable portable saw support, apparatus, unit, device, system, kit, or the like generally designated 100 is shown to include first and second base units 102 and 104, a cross-brace 106, saw supports 108 and 110, swing arms 112, 114, 116, and 118, and legs 120, 122, 124, and 126. Each of the base units 102 and 104 includes a top bracket 128, cross-brace vertical adjustment and support brackets 130, and inner and outer triangular or trapezoidal members 132 and 134.

In accordance with a preferred example, the adjustable portable saw support or device 100 is formed of 14 gauge metal or steel and is selectively and releasably held together with a plurality of bolts, screws, pins, or the like. Still further, each of the swing arms 112, 114, 116, and 18 includes a small outward flange or bend 136 to add additional strength or support to the swing arm. Each of the legs 120, 122, 124, and 126 is formed of a U or C-shaped metal channel. However, it is to be understood that in accordance with the present invention, 2"×4" members, boards, or lumber can be used for each of the legs. Also, the cross-brace 106 is formed of a U or C-shaped metal channel, or may be formed of a 2"×6" member, board, or lumber. Each of the swing arm supports 112, 114, 116, and 118 is supported in its horizontal position shown in FIG. 43 by a respective pivotally attached brace or support member 138 releasably or selectively attached to each leg. The device 100 includes a plurality of openings to allow for easy adjustment, assembly and disassembly of the device.

FIGS. 45–50 of the drawings depict an assembly instruction or process for assembling each of the base units 102 and 104 of the device 100. This is also described in Table I below.

Figure 43:
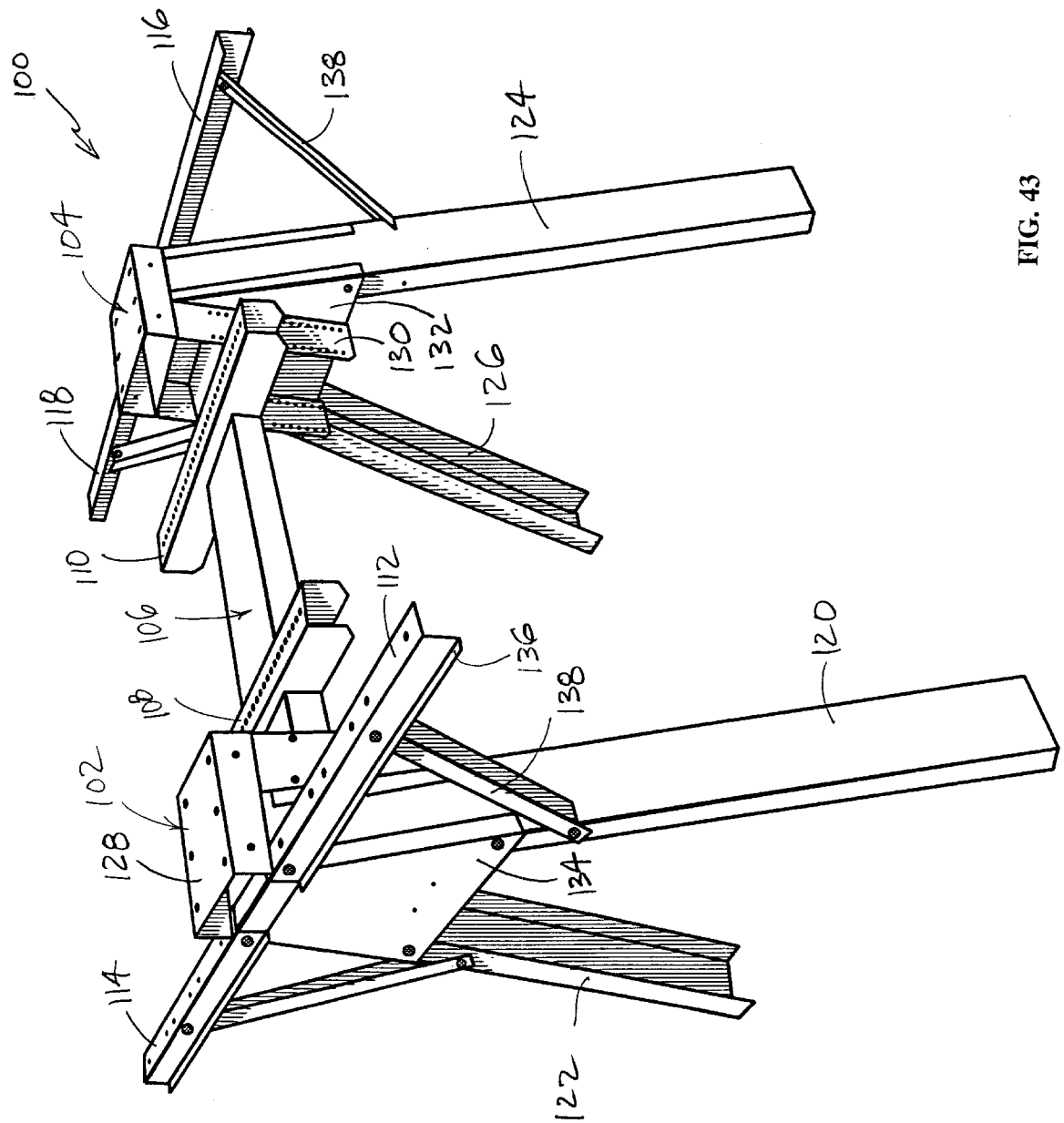

FIG. 43 depicts the device 100 in its fully assembled position ready to receive a saw or other power device or to be used without a saw and to receive 2"×6", 2"×4", 2"×10", 2"×12", members, boards, or lumber, and/or plywood to be adapted to form a work bench, work table, or the like.

Figure 44:
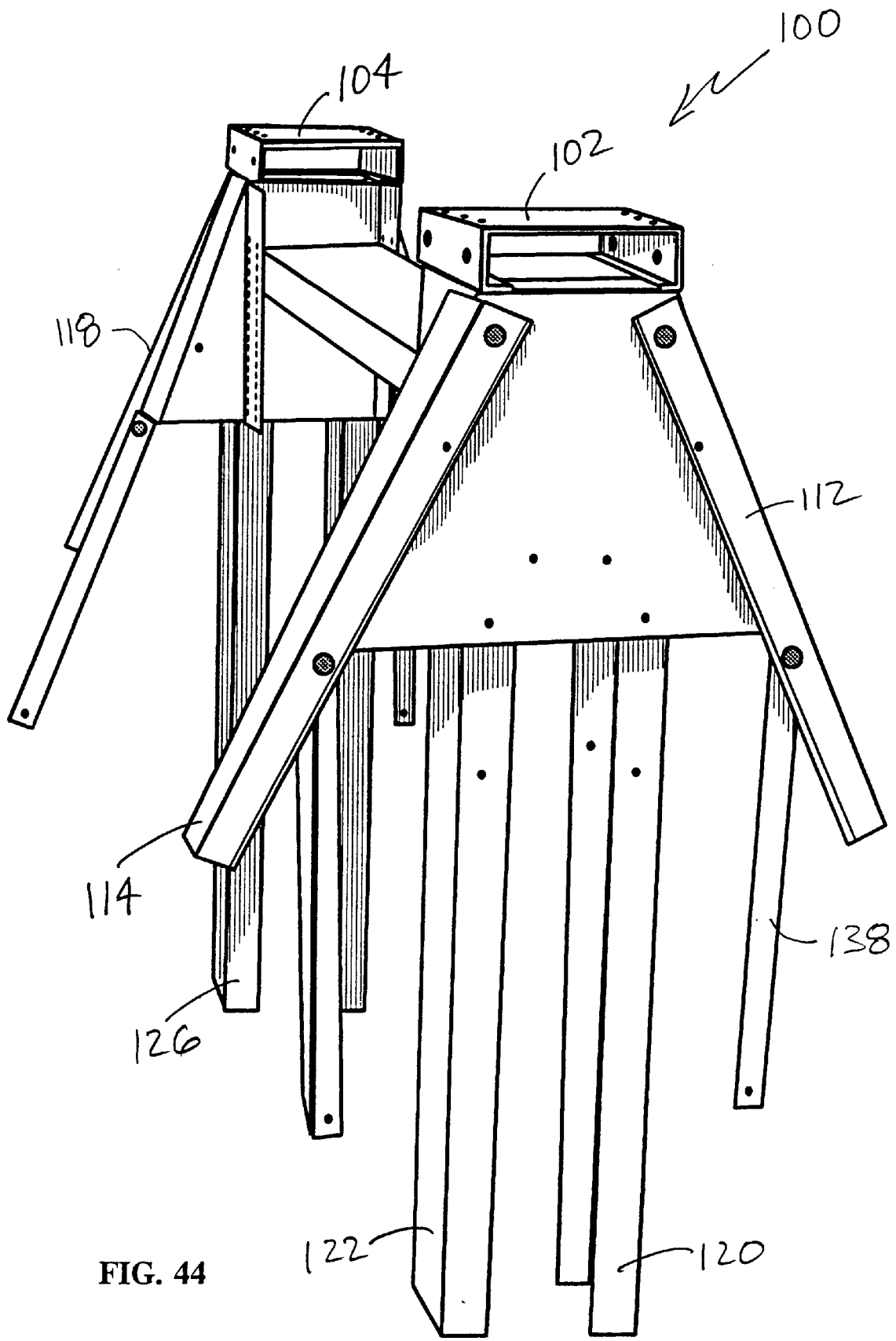
Figure 46:
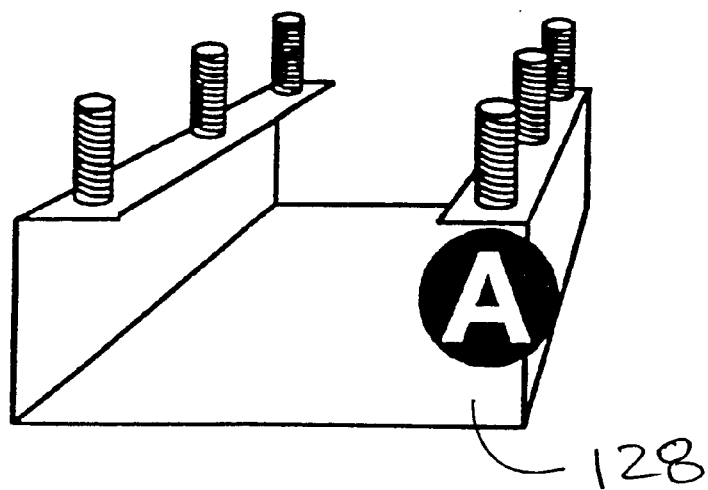
Figure 47:
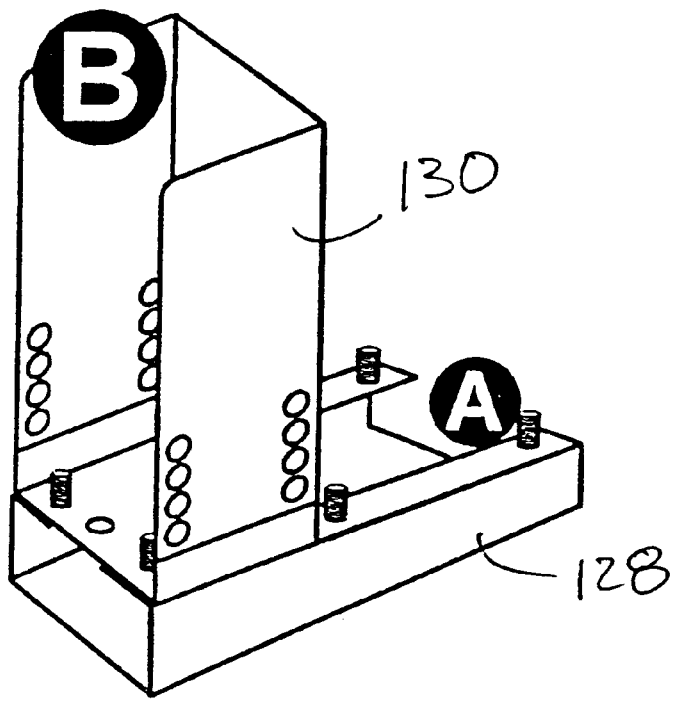
Figure 48:
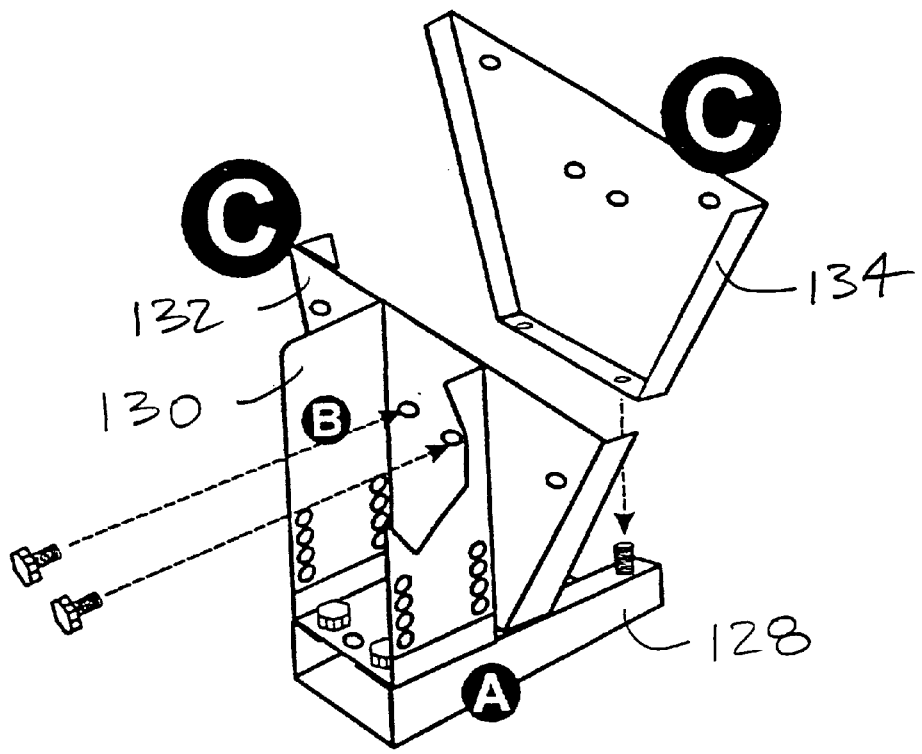
Figure 49:
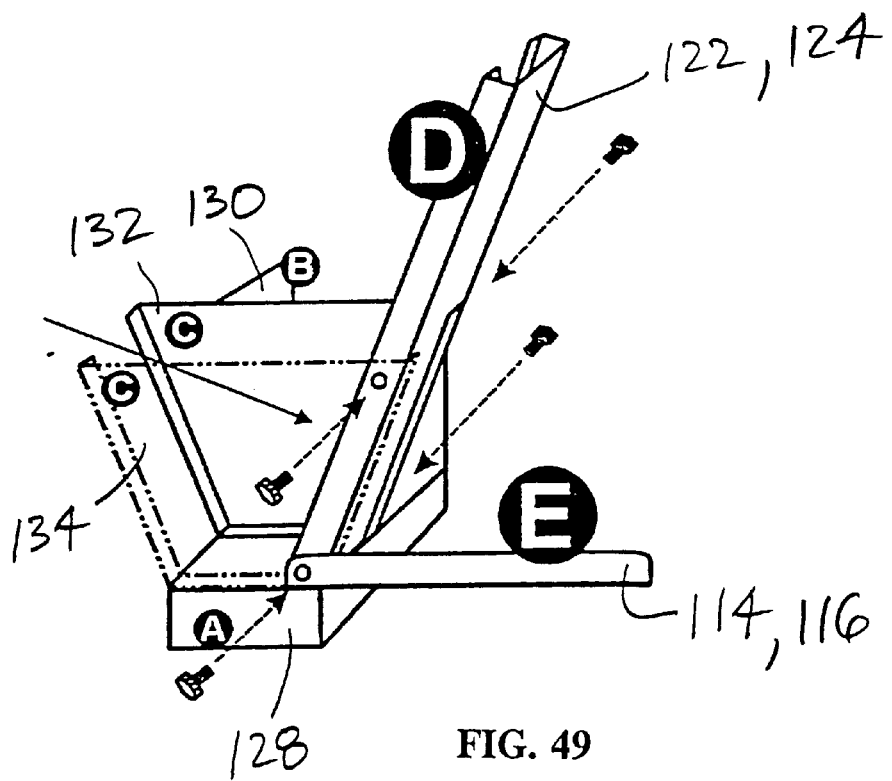
Figure 50:
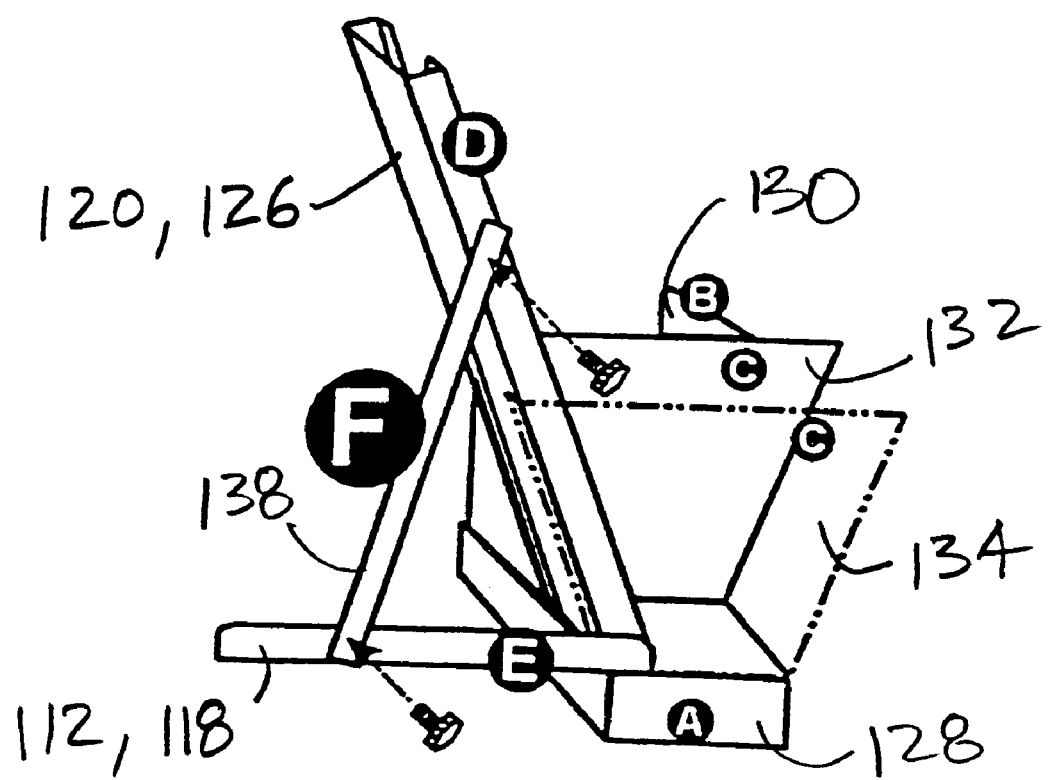

FIG. 44 shows the device 100 in its knocked down, ready to travel orientation with the legs folded in, the swing arms folded down, and saw supports removed.

Figure 51:
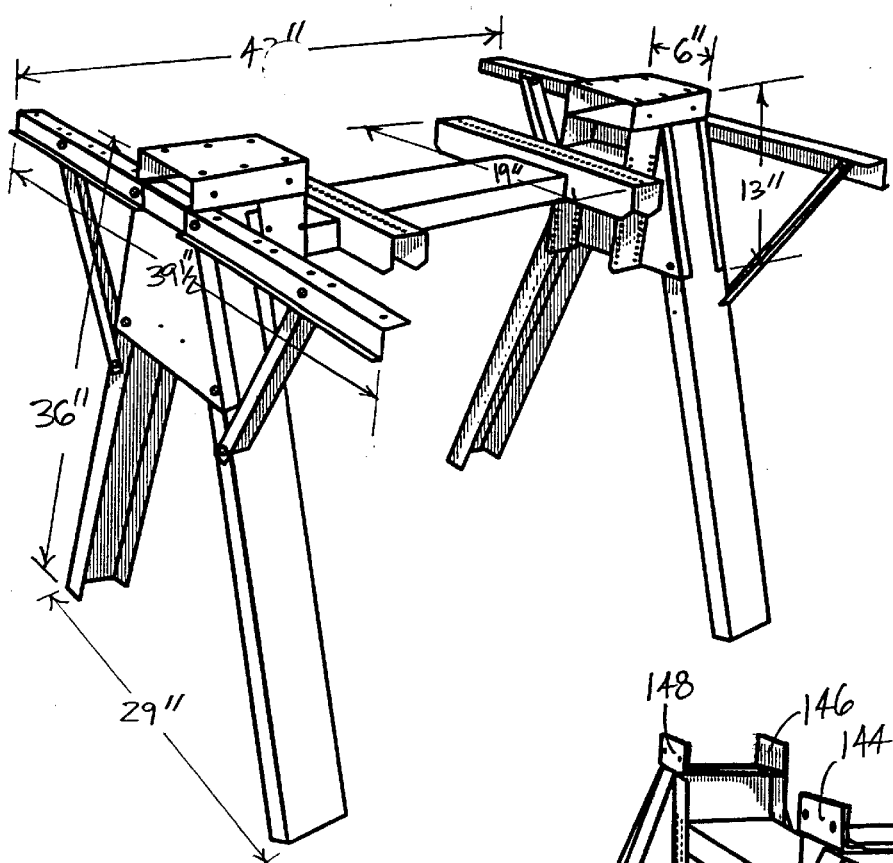

As shown in FIG. 51 and in accordance with a particular example of the present invention, the device 100 is made out of 14 gauge metal, stands about 3" high and 42" long, weighs about 53 lbs., and can be packaged in a box which is about 5" high, 17" wide, and 31" long. The portable saw support or device 100 will fit most miter and radial arm saws, also fits metal chop saws, table routers, wood planars, pipe threaders, or can be used to set up a complete shop. The device 100 can be adjusted to have a top from about 6" to 42" in width and from about 42" to 12 ft. long using 2"×6" members, boards, or lumber. The device 100 can hold over 450 lbs. weight and can be used for scaffolding. Also in accordance with this example, each of the legs is about 34" long and has a spread of about 29" between the bottom of adjacent legs of a base unit. Further, from tip to tip of the swing arms of each base unit is about 39½", from the base of the cross-brace support bracket 130 to the top of the top bracket 128 is about 13", the center to center dimension between saw support arms is about 24" and each cross-brace support bracket 130 includes a plurality of openings in two columns spaced by about 2" with adjacent openings spaced on ½" centers and with each column about 11½" long. The openings in the top of each of the saw support arms are either circular or oval. Each of the support arms is about 19½" long and about 2" to 3" wide.

In accordance with another embodiment of the present invention, a portable adjustable saw support or device generally designated 140 is similar in construction to the device 100 of FIG. 43 except that upper brackets 142, 144, 146 and 148 on each of base units 150 and 152 is open or not enclosed and as such forms a channel for receiving, for example, a 2"×6" member, board, or lumber.

Figure 53:
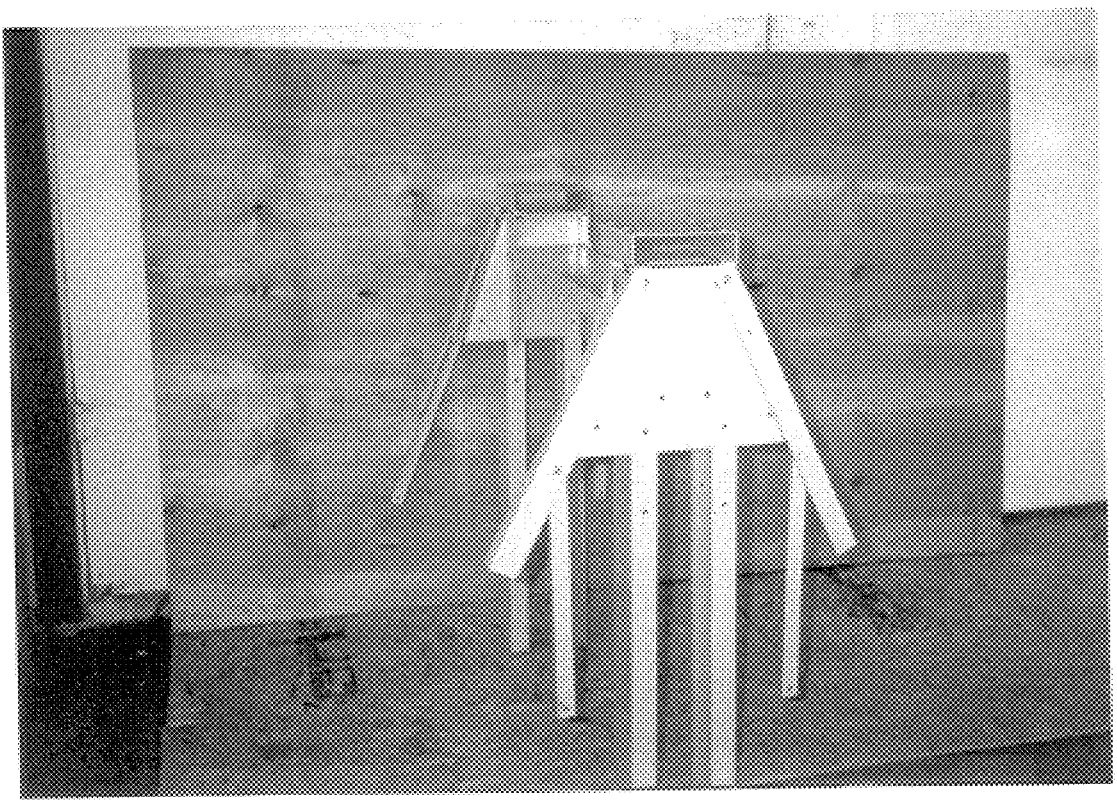
FIGS. 53–59 of the drawings are photographic representations of an adjustable, portable saw support or device substantially identical in construction to the portable saw support of FIGS. 43–51.
Figure 54:
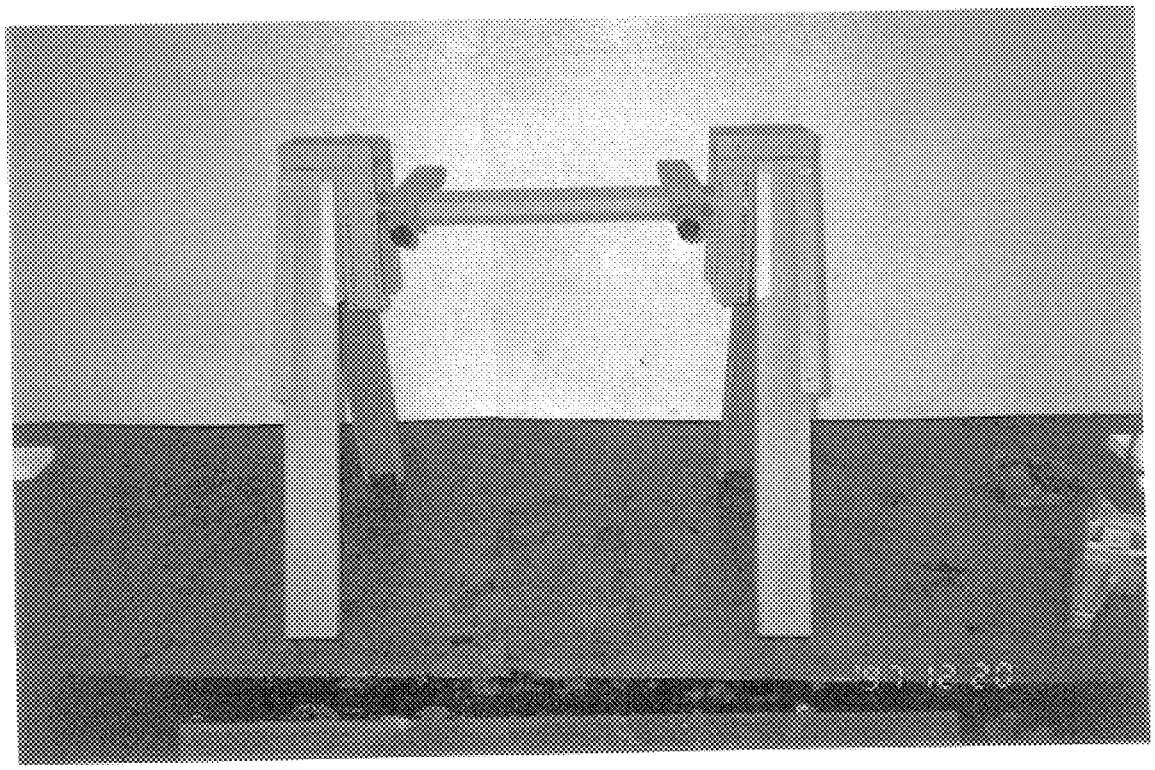
Figure 55:
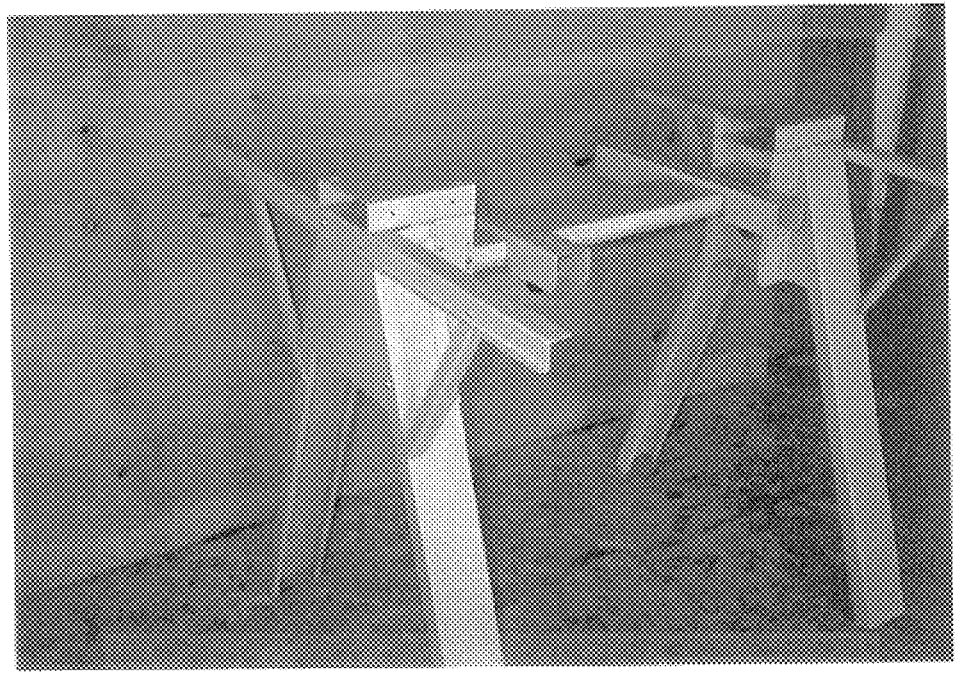
Figure 56:
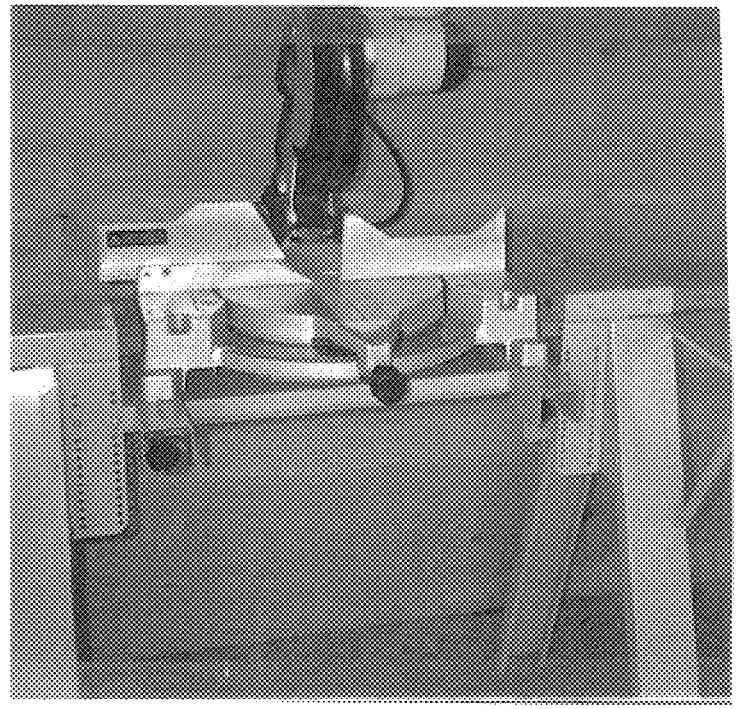

FIG. 53 depicts a portable saw support in a similar configuration to that of FIG. 44 of the drawings.

FIGS. 53–59 depict a device substantially identical to the device 100 of FIG. 43.

Figure 58:
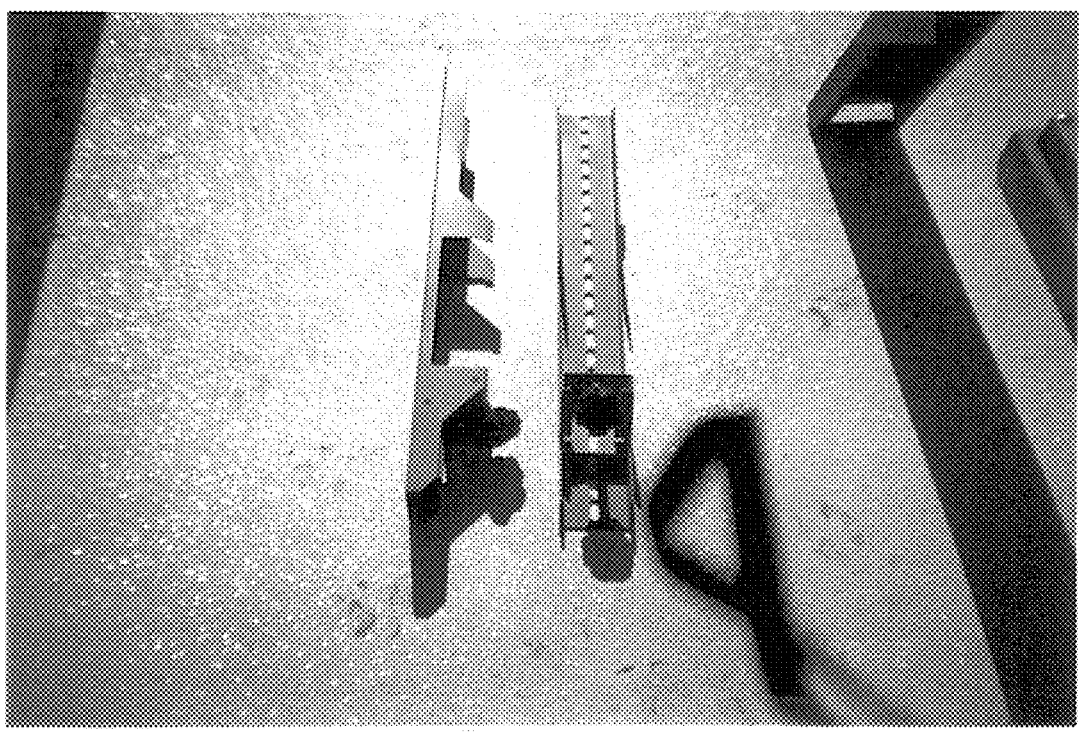
Figure 59:
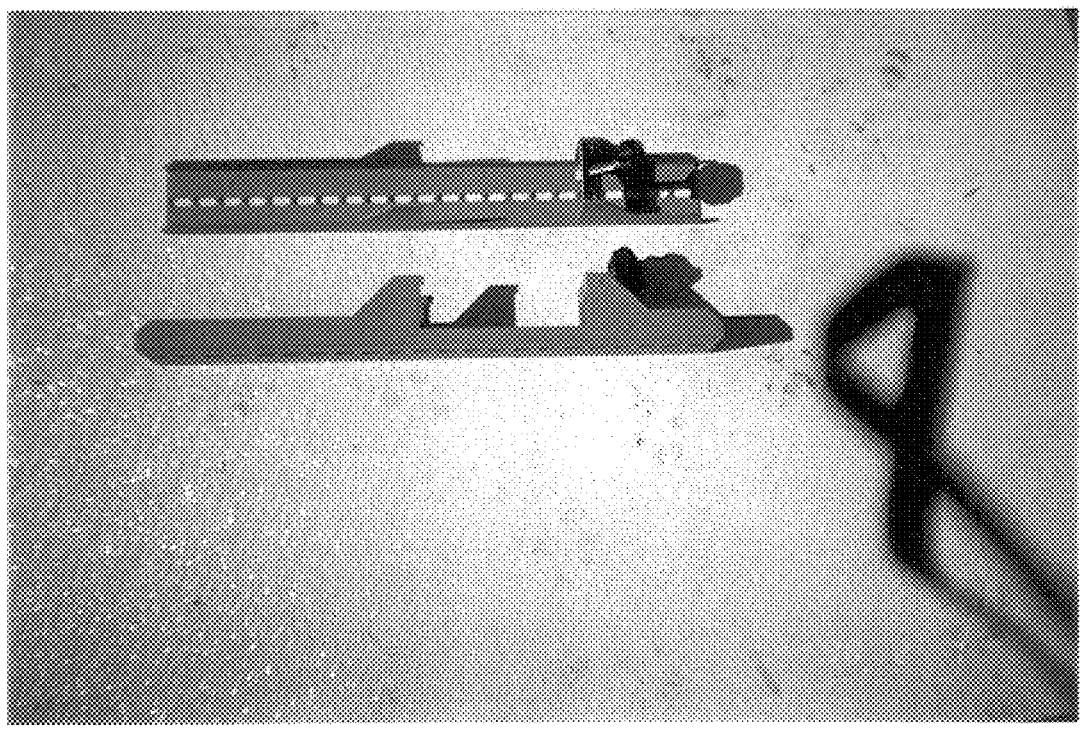

FIGS. 58 and 59 represent saw support arms or brackets substantially identical to the saw support arms 108 and 110 of FIG. 43. Note that in the example given in FIGS. 58 and 59, that the rear portion of the support arms includes depending flanges having smaller flanges or nubs at their lower end for hooking under the backside of the cross-brace 106 and a large black handle on the end of each of the threaded members for facilitating the easy tightening and loosening of the threaded member for attachment and detachment of the saw supports.

Figure 52:
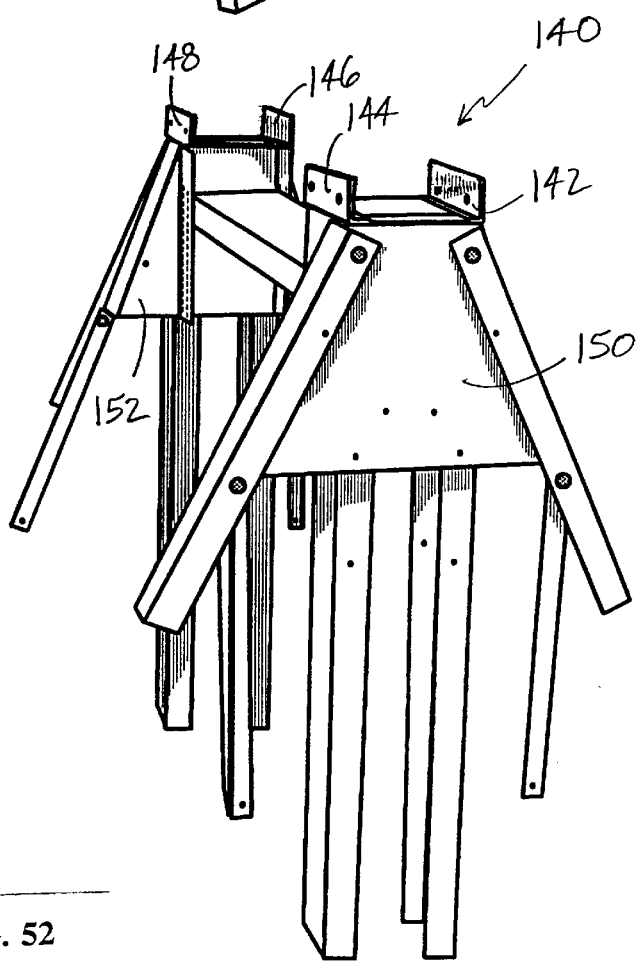
FIG. 52 is a perspective view representation of an adjustable, portable saw support or device in accordance with another embodiment of the present invention, wherein the top brackets on each of the base units are open.
Figure 60:
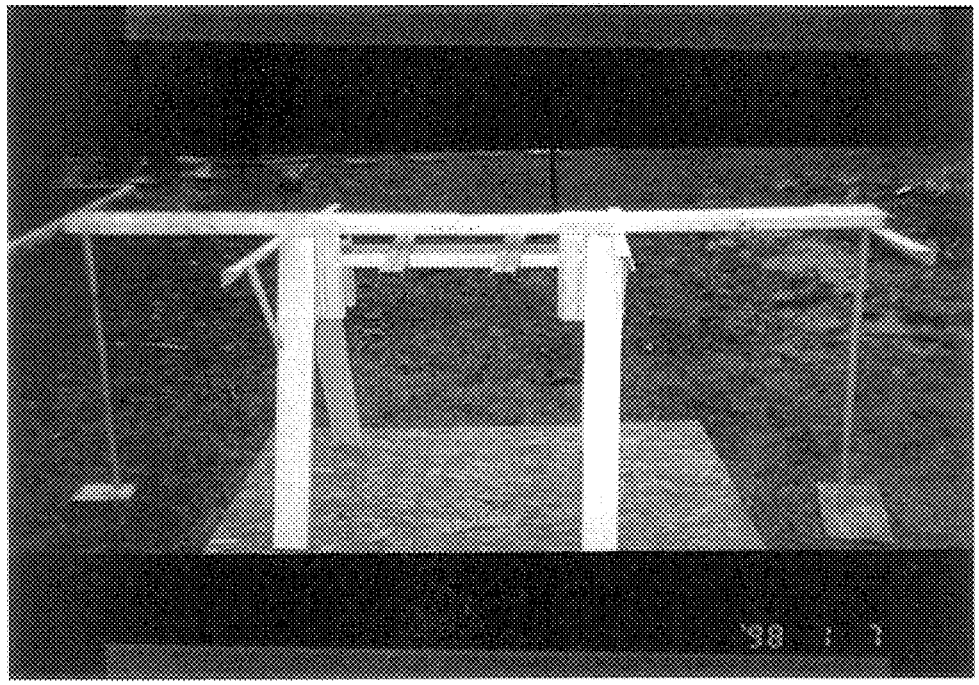
FIGS. 60–63 of the drawings are photographic representations of an adjustable, portable saw support or device in accordance with yet another embodiment of the present invention.
Figure 61:
Figure 62:
Figure 63:
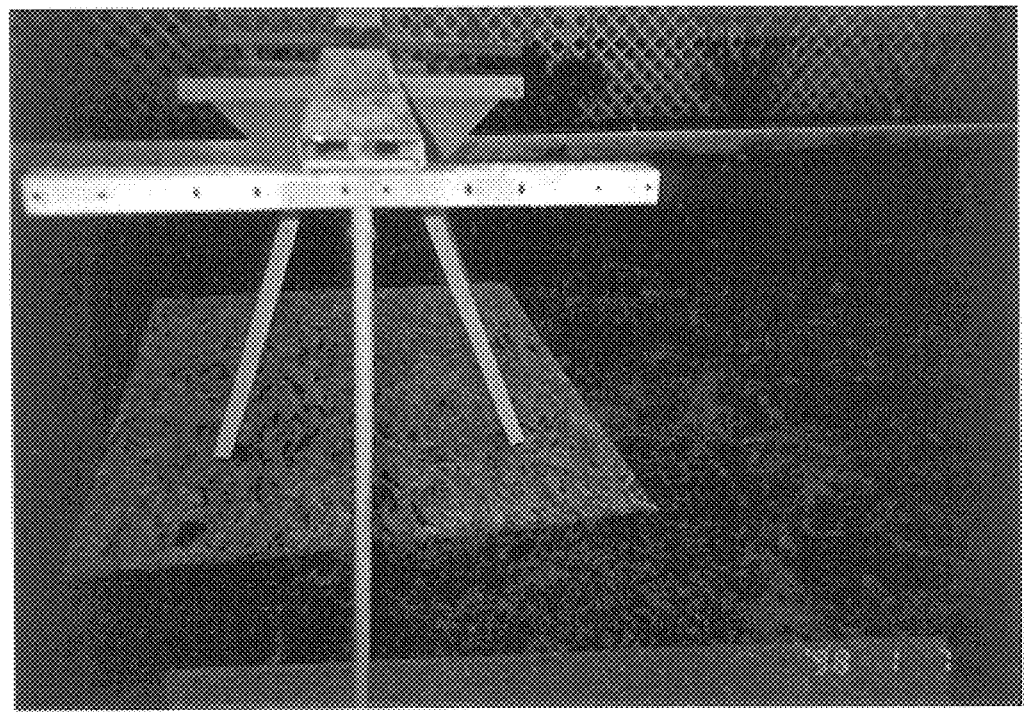

FIGS. 60–63 of the drawings depict an alternative embodiment similar to that shown in FIG. 52 with the addition of remote horizontal end braces and vertical support members or poles which provide for the elongation of the work bench or table (FIGS. 60 and 61), or for the elongation of the right and left hand support members adjacent the saw (FIGS. 62 and 63). Each of the rails or members is about 8 ft. long and each end brace is about 28" wide.

As shown in FIGS. 60 and 61 of the drawings, the adjustable, portable saw support or device has upper horizontal rails or support members formed of inverted channels with a horizontal cross-brace attached to the free end of each rail and having a vertical support member or pole extending downwardly therefrom.

As shown in FIGS. 60 and 61, the device is used without a saw to form a large work or support surface such as shown in FIGS. 66, 67, and wherein a plurality of boards or members are added across the horizontal braces.

Figure 12:
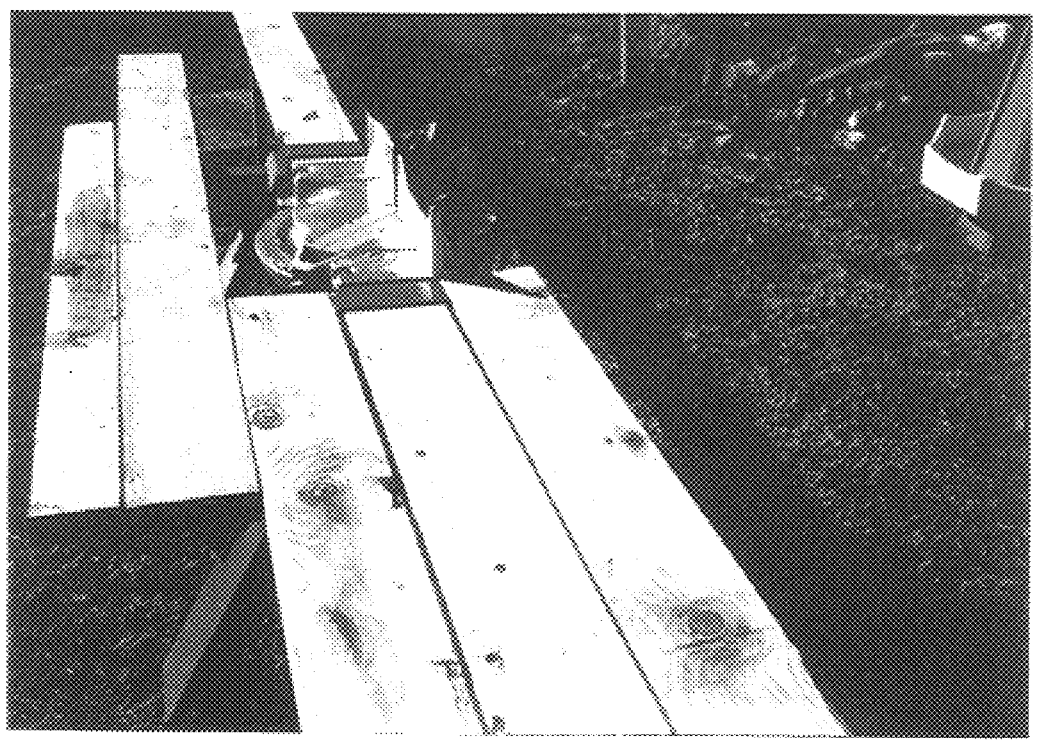
Figure 71:
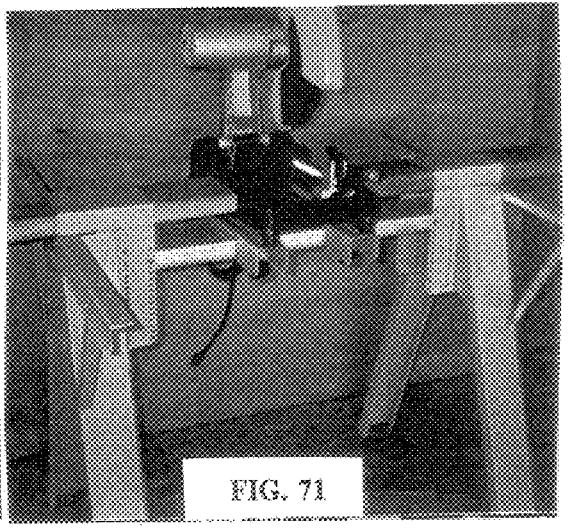
FIG. 71 is a photographic representation similar to FIG. 56.
Figure 72:
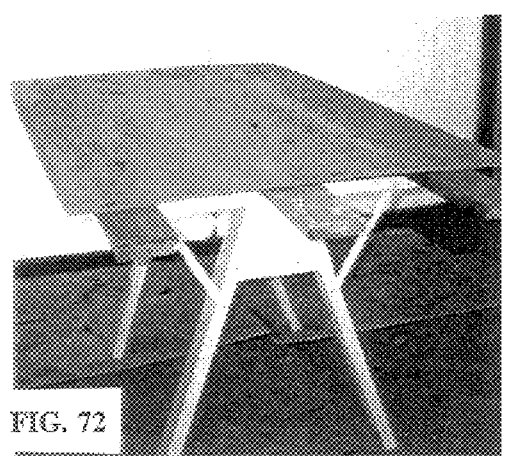
FIG. 72 is a photographic representation of the device in an arrangement having three horizontal members with a sheet of plywood laid across the three members.
Figure 73:
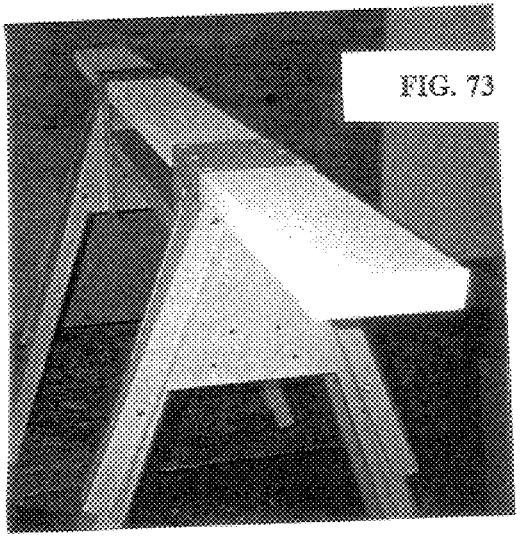
FIG. 73 is a photographic representation illustrating an application of the device similar to that of a saw horse with one horizontal member fed through the top of each base unit.
Figure 74:
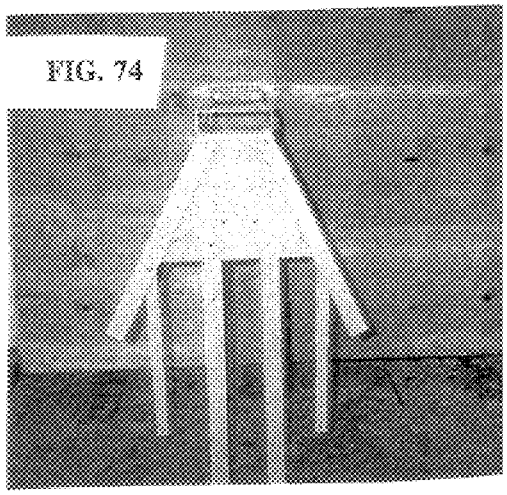
FIG. 74 is a photographic similar to FIG. 53.

FIGS. 62 and 63 illustrate an embodiment wherein a saw is to be added and the upper rails are separated from one another to accommodate the saw or other device and still provide for a large support or working surface adjacent each side of the saw such as shown in FIGS. 71 or 12 of the drawings.

With respect to FIGS. 60–63 of the drawings, the horizontal cross-brace and vertical support or pole therefor are attached to the ends of the horizontal rails via a quick release mechanism which allows for insertion and removal of the pole in the end of the rail.

FIG. 64–73 of the drawings depict alternative arrangements or applications of a device similar to the device 100 of FIG. 43.

Figure 70:
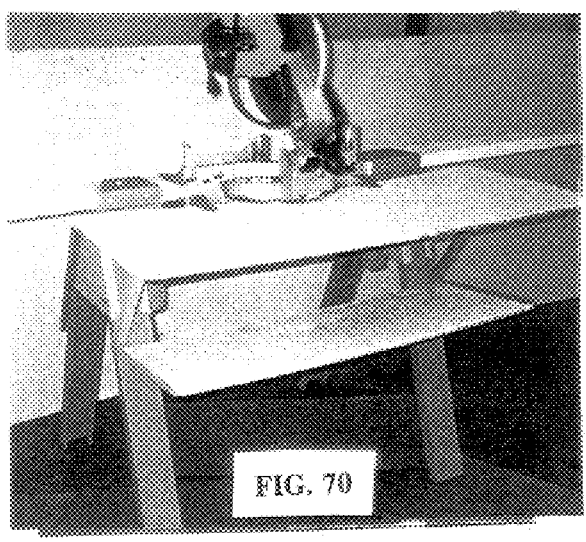
FIG. 70 is a rear view of the adjustable, portable saw support arrangement of FIG. 65.

With respect to FIGS. 57, 64 and 70 of the drawings, a secondary horizontal brace can be added at the base of each support member (for example support member 138 of device 100 of FIG. 43) to extend out horizontally from the leg and provide an additional support surface or to form a shelf below the primary work surface.

Figure 57:
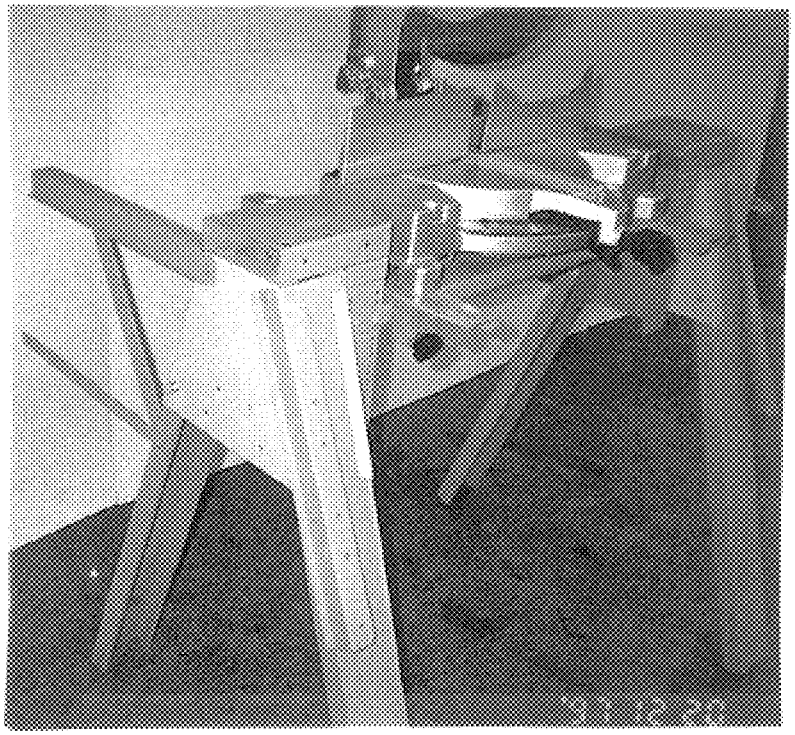

FIG. 65 is similar to that of FIG. 57 of the drawings with the addition of elongate boards or members in the top of each base unit to provide an elongate surface for lumber or other members being fed to the saw.

Figure 75:
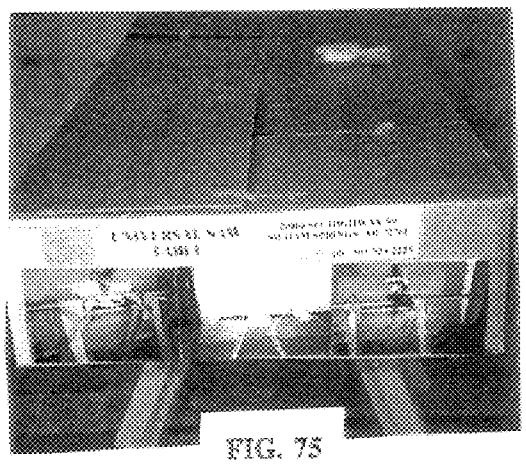
FIG. 75 is a photographic representation of a packaged adjustable, portable saw support.

FIG. 75 is a photographic representation of a packaged adjustable, portable saw support with the swing arms extending downwardly out of the bottom of the box and acting as legs for supporting the box containing the other saw support components.

Figure 76:
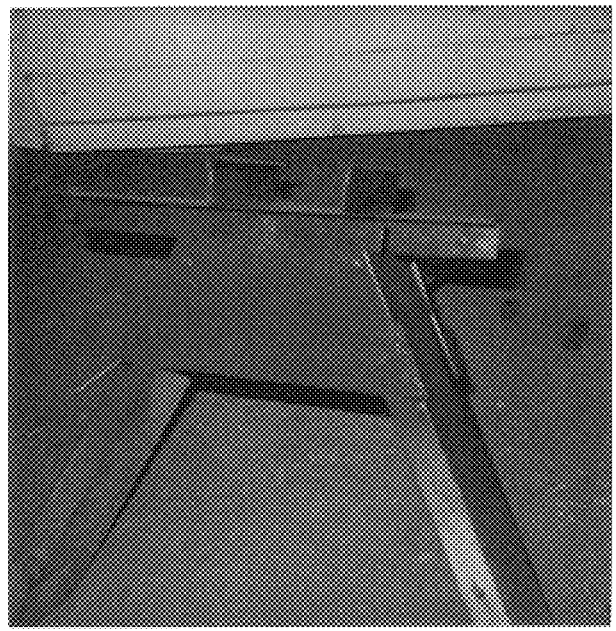
FIGS. 76 and 77 are photographic representations of the outside and inside of a base unit similar to the base unit shown in FIGS. 1–7.
Figure 77:
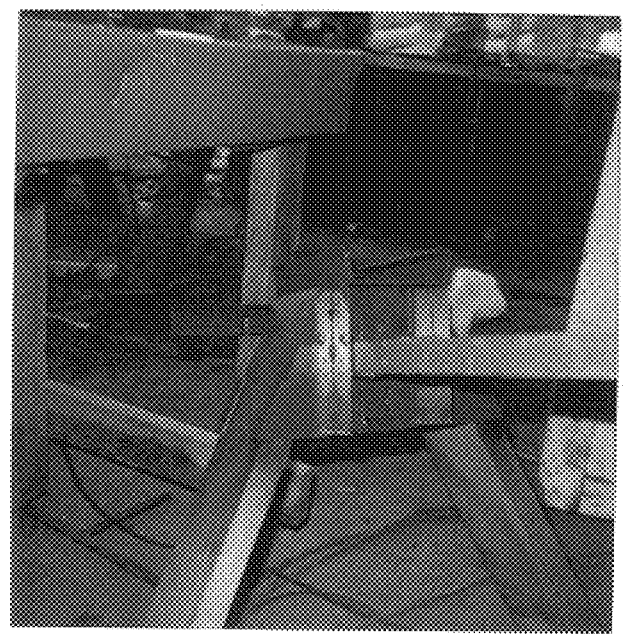
Figure 78:
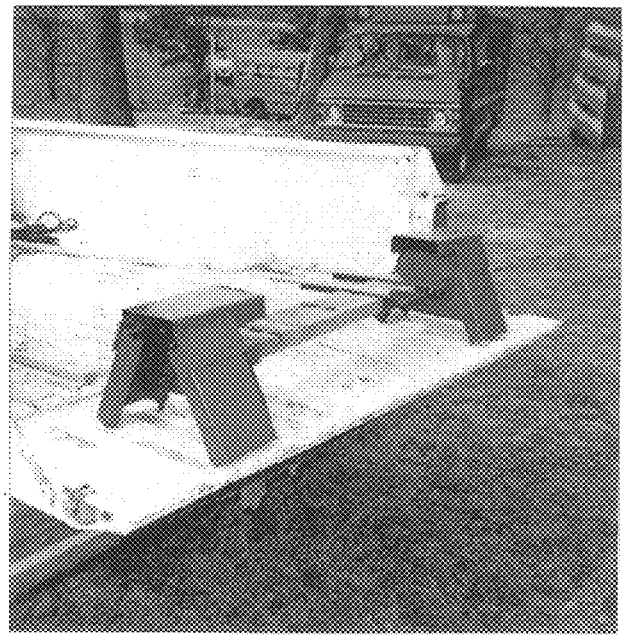
FIGS. 78–81 are photographic representations of a portable saw support or device in accordance with another embodiment of the present invention.
Figure 79:
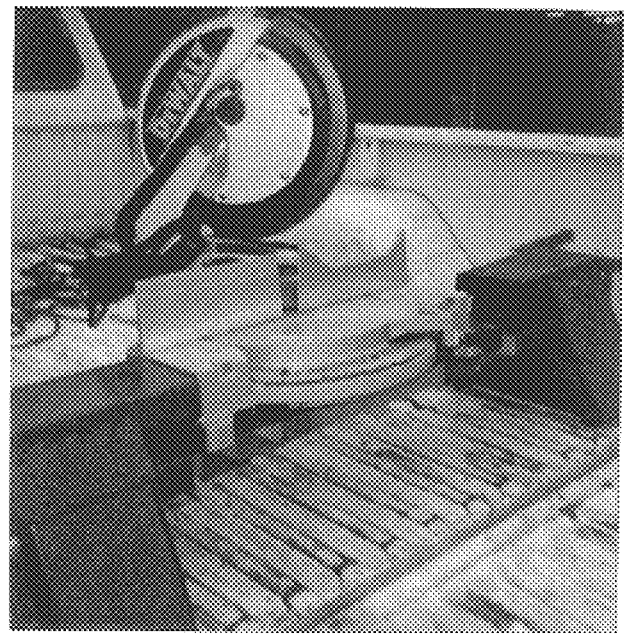
Figure 80:
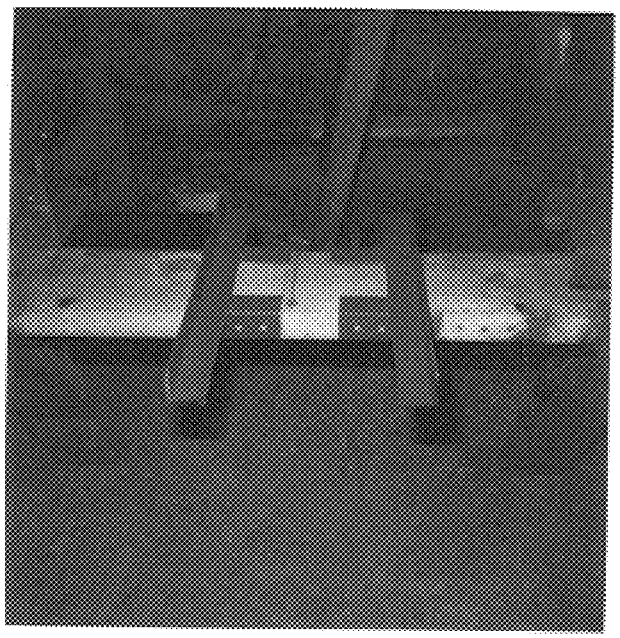
Figure 81:
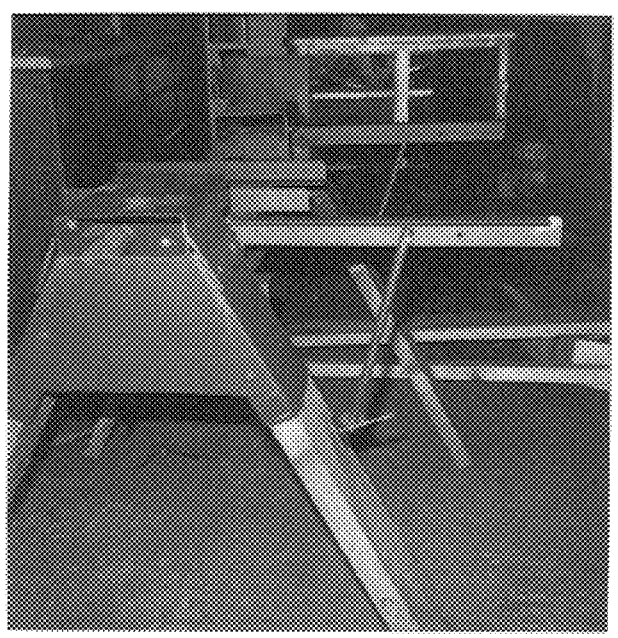

FIGS. 76 and 77 illustrate a base unit similar in construction to the base unit 12 or 14 of device 10 of FIGS. 1–7.

FIGS. 78–81 depict an alternative embodiment of a saw support or device with each base unit including an enclosed top bracket and angled U or C channels adapted to receive, for example, 2"×6" wooden legs. Further, a triangular or trapezoidal end plate may be attached to hold the leg receiving channels in position.

TABLE I

ASSEMBLY INSTRUCTIONS

The only tool you will need to assemble the Underwood Stable Table is a 7/16" wrench or a pair of pliers!.

Step 1—Place Part A on a flat work surface as shown with the bolts pointing up.

Step 2—Place Part B on Part A and use 2 nuts to secure it in the position shown.

Step 3—There are 2 Part Cs. They are identical. Place one next to Part B on Part A and secure with 2 nuts. Use 2 bolts to secure Part B and C together. Then place the other Part C in place on the remaining bots on Part A and secure with 2 more nuts.

Step 4—Part D is a table leg, Part E is a table support. Part D fits inside the braces (Parts C) as shown. Hold Part E in place on the outside of Part C while you fit a bolt and secure it with a nut. Use another bolt and nut on the other side, which fastens together Parts B, C and D. Use 2 more nuts and bolts to lock Part D to the assembly as shown.

Step 5—Part F is the table support brace. Secure it in the position shown with 2 nuts and bolts. Repeat Steps 4 and 5 to assemble the remaining leg. You have now assembled one end of the Underwood Universal Saw Table. Repeat the above steps for the other end and you're in (FIGS. 45–50).

Whereas, the present invention has been described in relation to the drawings attached hereto, it should be understood that other and further modifications, apart from those shown or suggested herein, may be made within the spirit and scope of this invention. For example, three or more base units may be used to form an elongate saw support or work table. As an example, additional base units can be added near each end of the table of FIG. 67.

What is claimed is:

1. An adjustable portable saw support, comprising:
    at least a pair of spaced base units with each base unit having triangular shaped inner and outer members, a cross-brace support bracket attached to said inner member, and a top
    bracket attached to the top of said members for supporting at least one elongate rectangular member in a horizontal orientation therein.

2. The adjustable portable saw support as recited in claim 1, wherein said base units are spaced apart by a vertically adjustable cross-brace placed between adjacent base units with the ends thereof attached to said cross-brace support brackets of said base units.

3. The adjustable portable saw support as recited in claim 2 further including spaced equipment mounting members extending transverse to and supported by said cross-brace.

4. The adjustable portable saw support as recited in claim 1 wherein the base units of the saw support are made of a relatively lightweight and sturdy material.

5. The adjustable portable saw support as recited in claim 1 wherein the base units of the saw support are adapted to use a plurality of at least one of bolts and pins to attach at least one of 2"×4" and 2"×6" members thereto.

6. The adjustable portable saw support as recited in claim 1, further including a pair of legs extending from each base unit and at least one swing arm support attached to at least one of a base unit and leg.

7. The adjustable portable saw support as recited in claim 1, wherein each of said base units includes an adjustable horizontal end brace attached to the outer member thereof.

8. The adjustable portable saw support as recited in claim 2, wherein said cross-brace support bracket of each of said base units provides for vertical adjustment of said cross-brace.

9. The adjustable portable saw support as recited in claim 1, wherein each of said top brackets of said base units is adapted to receive a 2"×6" member.

10. The adjustable portable saw support as recited in claim 1, wherein said support includes at least three base units.

11. The adjustable portable saw support as recited in claim 10, further including at least two cross-braces each placed between adjacent base units.

12. The adjustable portable saw support as recited in claim 11, further including equipment mounting members extending transverse to and supported by the cross-braces.

13. A base unit for a portable saw support, comprising:
    a top bracket, a cross-brace attachment bracket attached to the base of the top bracket, and a pair of spaced trapezoidal shaped support plates attached to the base of said top bracket with the cross-brace attachment bracket adjacent one support plate.

14. An adjustable support table, comprising:
    at least a pair of spaced base units with each base unit having triangular shaped inner and outer members and a top bracket attached thereto for supporting at least one elongate rectangular member in a horizontal orientation therein.

15. The adjustable support table as recited in claim 14, wherein a vertically adjustable cross-brace is placed between adjacent base units.

16. The adjustable support table as recited in claim 14, wherein the base units of the support table are made of a relatively lightweight and sturdy material.

17. The adjustable support table as recited in claim 14, wherein the support table is adapted to be easily assembled, disassembled and adjusted using a plurality of at least one of bolts and pins and at least one of 2"×4" and 2"×6" members.

18. The adjustable support table as recited in claim 14, further including a pair of legs extending from each base unit and at least one swing arm support attached to at least one of a base unit and leg.

19. The adjustable support table as recited in claim 14, wherein each of said base units includes an adjustable horizontal end brace.

20. The adjustable support table as recited in claim 14, wherein each of said base units includes a cross-brace support and adjustment bracket.

21. The adjustable portable saw support as recited in claim 1, wherein said elongate rectangular member is a board.

22. The adjustable portable saw support as recited in claim 1, wherein said elongate rectangular member is lumber.

23. The adjustable support table as recited in claim 14, wherein said elongate rectangular member is a board.

24. The adjustable support table as recited in claim 14, wherein said elongate rectangular member is lumber.

* * * * *